United States Patent
Murata et al.

(10) Patent No.: US 8,170,269 B2
(45) Date of Patent: May 1, 2012

(54) IMAGE PROCESSING APPARATUS, IMAGE PROCESSING METHOD, AND PROGRAM

(75) Inventors: Makoto Murata, Tokyo (JP); Takeshi Fukuda, Chiba (JP); Daisuke Mochizuki, Chiba (JP); Tamaki Kojima, Kanagawa (JP); Masatomo Kurata, Tokyo (JP)

(73) Assignee: Sony Corporation (JP)

( * ) Notice: Subject to any disclaimer, the term of this patent is extended or adjusted under 35 U.S.C. 154(b) by 1125 days.

(21) Appl. No.: 11/714,074

(22) Filed: Mar. 5, 2007

(65) Prior Publication Data

US 2007/0274596 A1 Nov. 29, 2007

(30) Foreign Application Priority Data

Mar. 7, 2006 (JP) ................................ P2006-060592

(51) Int. Cl.
*G06K 9/00* (2006.01)
(52) U.S. Cl. ...................................................... 382/100
(58) Field of Classification Search .................... 382/209
See application file for complete search history.

(56) References Cited

U.S. PATENT DOCUMENTS 6,529,613 B1 * 3/2003 Astle .............................. 382/103
7,095,786 B1 * 8/2006 Schonfeld et al. ........ 375/240.16
2003/0112865 A1 * 6/2003 Divakaran et al. ........ 375/240.01
2005/0213843 A1 * 9/2005 Nojima et al. ................. 382/274
2006/0257048 A1 * 11/2006 Lin et al. ........................ 382/276
2008/0150945 A1 * 6/2008 Wang et al. .................... 345/427

FOREIGN PATENT DOCUMENTS

| JP | 2001167110 A | 6/2001 |
| JP | 2002-027411 A | 1/2002 |
| JP | 2003-264757 A | 9/2003 |
| JP | 2003256432 A | 9/2003 |
| JP | 2005333381 A | 12/2005 |

* cited by examiner

*Primary Examiner* — Brian Werner
*Assistant Examiner* — Nirav G Patel
(74) *Attorney, Agent, or Firm* — Lerner, David, Littenberg, Krumholz & Mentlik, LLP

(57) ABSTRACT

The present invention provides an image processing apparatus which may include scene change detection means, object detection means, and determining means. The scene change detection means may be configured to detect a scene change in a motion picture. The object detection means may be configured to detect a predefined object that is contained as a subject in still pictures constituting the motion picture. The determining means may be configured to determine, in accordance with the result of a detection operation that is performed by the object detection means in relation to still pictures constituting a predefined scene between a scene change detected by the scene change detection means and a chronologically adjacent scene change, whether the predefined scene contains a still picture containing the predefined object as a subject.

15 Claims, 24 Drawing Sheets

| SCENE CHANGE DATA STRUCTURE | | |
| --- | --- | --- |
| | START TIME | END TIME |
| SCENE 1 | 0.0 | 100.0 |
| SCENE 2 | 100.0 | 180.0 |
| SCENE 3 | 180.0 | 220.0 |
| SCENE 4 | 220.0 | 280.0 |
| SCENE 5 | 280.0 | 400.0 |
| SCENE 6 | 400.0 | 500.0 |

FIG.11

| FACE DATA STRUCTURE | |
|---|---|
| FACE COUNT | 2 |
| FACE POSITION (x, y) | (-0.7, 0.5), (0.2, 0.4) |
| FACE AREA | 0.25, 0.11 |

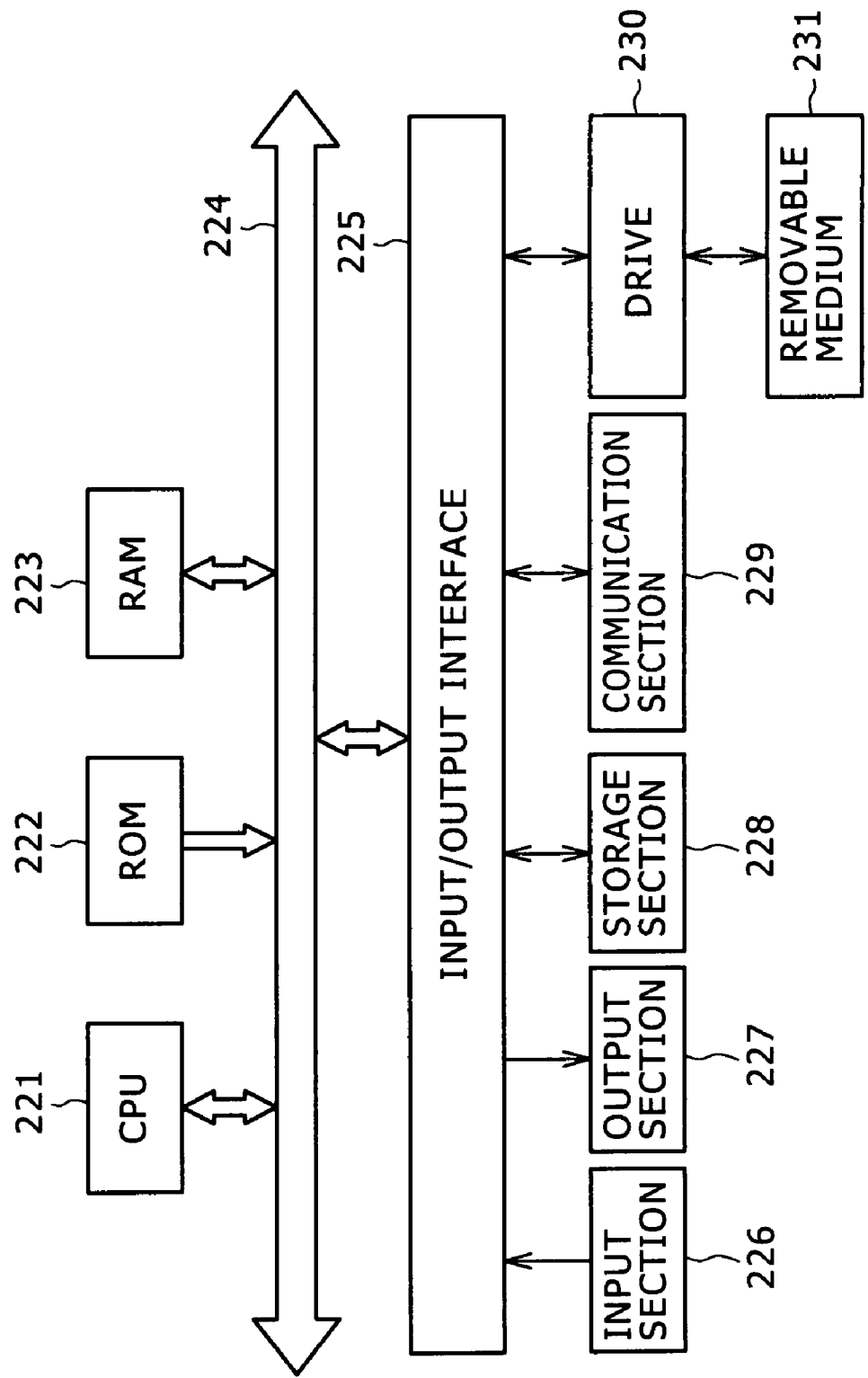

IMAGE PROCESSING APPARATUS, IMAGE PROCESSING METHOD, AND PROGRAM

CROSS-REFERENCE TO RELATED APPLICATIONS

The present application claims priority from Japanese Patent Application No. JP 2006-060592 filed in the Japanese Patent Office on Mar. 7, 2006, the entire content of which is incorporated herein by reference.

BACKGROUND OF THE INVENTION

1. Field of the Invention

The present invention relates to an image processing apparatus, image processing method, and program, and more particularly to an image processing apparatus, image processing method, and program for determining whether a predefined object is imaged as a subject in individual scenes.

2. Description of the Related Art

In recent years, ordinary users often shoot motion pictures for themselves due, for instance, to the widespread of low-priced camcorders, well-developed motion picture shooting functions based on the MPEG (Moving Picture Experts Group) 4 format for use in digital still cameras, digital movie cameras, and the like, and improved motion picture shooting functions of cellular phones.

In reality, however, most users do not often view their shot motion pictures, do not take the trouble to load them into a personal computer, edit them, and present them to their friends, or do not even load them into a personal computer.

However, it is conceivable that most users may often view their shot motion pictures and take the trouble to load them into a personal computer, edit them, and present them to their friends if an interesting scene, such as a scene in which a user and his/her friends are enjoying themselves or a scene including a close-up of children, can be readily reproduced or edited. It is also conceivable that users may actually need a function for readily reproducing or editing interesting scenes.

For example, a chronological film roll view and a thumbnail view have been previously used for a scene search. The chronological film roll view displays chronologically and unidirectionally arranged still pictures constituting a shot motion picture. The thumbnail view displays a thumbnail of the first frame or other predefined frame of still pictures constituting a shot motion picture. Both of these views do not make it easy to find a target scene because it is bothersome to confirm the chronologically arranged still pictures within the former view. In addition, the content subsequent to a thumbnailed still picture in the latter view is often forgotten.

The chronological film roll view is a display technique that is used, for instance, by a motion picture editing application for use on a personal computer. The thumbnail view is a display technique that is used by a camcorder or other imaging apparatus.

A scene in which a user and his/her friends are enjoying themselves, a scene including a close-up of children, or other scene that interests the user is a scene in which a human face is visible. Therefore, a previously proposed scene search method detects a human face in a motion picture, presents to the user the motion picture position at which the human face is detected, and prompts the user to select a scene for, for instance, reproduction.

A common face detection algorithm handles a still picture as a target. Therefore, a motion picture containing, for example, 30 fps (frames per second) is thinned to a motion picture containing several frames per second for the purpose of reducing the processing load. The resulting still pictures constituting the thinned motion picture are then searched for a face.

The technology disclosed by Japanese Patent Laid-open No. 2002-27411 detects not only human faces within a recorded video program but also video scene changes, and selects a motion picture position for reproduction in accordance with the detected information. The technology disclosed by Japanese Patent Laid-open No. 2003-264757 handles, for example, a broadcast news program, locates a scene in which motion is limited and a frame matching a certain model image (having a particular color distribution) exists, and determines the located scene as a segment in which a face is visible.

SUMMARY OF THE INVENTION

When a still picture position at which a human face is detected is to be presented to the user to prompt for reproduction target section, noncontiguous frames may be presented because face detection does not occur depending on the orientation of the human face even when humans are visible in the entire scene.

FIG. 1 shows an example illustrating the results that are obtained when a particular scene of a motion picture is searched for a face.

Images in FIG. 1 are numbered 1 to 7. These images are still pictures constituting a motion picture that is obtained when a motion picture shot, for instance, by a camcorder is thinned to a predetermined frame rate. Still pictures 1 to 7 are targeted for face detection. Still pictures removed for thinning purposes and excluded from face detection are positioned between the still pictures shown in FIG. 1.

In the example shown in FIG. 1, humans and their heads are visible in still pictures 1 to 7. However, only still pictures 2 and 6 are detected as still pictures containing a face depending, for instance, on the orientation of a face.

In the above case, the positions of still pictures 2 and 6 are presented to the user. The user can select the position of still picture 2 to reproduce a motion picture between still pictures 2 and 3, in which a face was detected, or select the position of still picture 6 to reproduce a motion picture between still pictures 6 and 7. In this case, however, the entire scene, which contains still pictures 1 to 7, is difficult to be reproduced completely. Only some portions of the scene can be reproduced separately.

Further, a significant number of still picture positions are presented to the user. Eventually, it is difficult to locate a portion of the motion picture that is to be reproduced.

An embodiment of the present invention has been made in view of the above circumstances and provides a method, for instance, for presenting an appropriate portion of a motion picture, which can be readily handled by the user, by determining whether a predefined object is imaged as a subject in individual scenes.

An image processing apparatus according to an embodiment of the present invention may include scene change detection means, object detection means, and determining means. The scene change detection means may be configured to detect a scene change in a motion picture. The object detection means may be configured to detect a predefined object that is contained as a subject in still pictures constituting the motion picture. The determining means may be configured to determine, in accordance with the result of a detection operation that is performed by the object detection means in relation to still pictures constituting a predefined scene between a scene change detected by the scene change detection means and a chronologically adjacent scene change, whether the predefined scene contains a still picture containing the predefined object as a subject.

The object detection means may be allowed to further detect information that represents features of the predefined object detected from still pictures. The determining means may be allowed to achieve chronological pattern recognition of the information representing the features of the predefined object detected by the object detection means and determine whether the predefined scene contains a still picture containing the predefined object as a subject.

The image processing apparatus may further include storage means configured to store a first model that is derived from a result of the same detection operation that is performed by the object detection means in relation to still pictures constituting a scene containing a still picture containing the predefined object as a subject and will be used as recognition information for pattern recognition by the determining means.

The storage means may be allowed to further store a second model that is derived from a result of the same detection operation that is performed by the object detection means in relation to still pictures constituting a scene containing a still picture that does not contain the predefined object as a subject. The determining means may be allowed to determine, in accordance with a score obtained from the first model as a result of a detection operation performed by the object detection means and a score obtained from the second model, whether the predefined scene contains a still picture containing the predefined object as a subject.

The object detection means may be allowed to further detect at least the information about the number of occurrences of the predefined object that is contained as a subject in still pictures constituting the motion picture, the information about the predefined object's position relative to a predefined position of a still picture, or the information about the area of the predefined object. The determining means may be allowed to use one or more items of information detected by the object detection means to determine whether the predefined scene contains a still picture containing the predefined object as a subject.

The image processing apparatus may further include reproduction means configured to reproduce scenes of the motion picture that are determined by the determining means to contain a still picture containing the predefined object as a subject.

The reproduction means may be allowed to further display the positions within the entire motion picture of scenes that are determined by the determining means to contain a still picture containing the predefined object as a subject.

When a scene change within the motion picture is to be detected by comparing the difference in features of two chronologically adjacent still pictures against a threshold value, the scene change detection means may be allowed to detect a scene change in which different scene granularities are defined with the threshold value changed.

An image processing method or program according to an embodiment of the present invention may include detecting a scene change in a motion picture; detecting a predefined object that is contained as a subject in still pictures constituting the motion picture; and determining, in accordance with the result of a detection operation that is performed to detect the predefined object in still pictures constituting a predefined scene between a detected scene change and a chronologically adjacent scene change, whether the predefined scene contains a still picture containing the predefined object as a subject.

In an embodiment of the present invention, a scene change in a motion picture may be detected, and a predefined object that is contained as a subject in still pictures constituting the motion picture may be detected. Further, a determination may be formulated, in accordance with the result of a detection operation that is performed to detect the predefined object in still pictures constituting a predefined scene between a detected scene change and a chronologically adjacent scene change, to determine whether the predefined scene contains a still picture containing the predefined object as a subject.

According to an embodiment of the present invention, it may be possible to determine whether a predefined object is imaged as a subject in individual scenes.

BRIEF DESCRIPTION OF THE DRAWINGS

FIG. 11 shows an example of face data;

FIG. 25 is a block diagram illustrating a typical configuration of a personal computer.

DETAILED DESCRIPTION

An embodiment of the present invention will now be described. The relationship between the constituent features of the present invention and the embodiment described in this document or depicted in the accompanying drawings is exemplified below. This statement verifies that the embodiment supporting the present invention is described in this document or depicted in the accompanying drawings. Therefore, even if a certain embodiment is not described here as an embodiment that corresponds to the constituent features of the present invention although the embodiment is described in this document or depicted in the accompanying drawings, it does not mean that the embodiment does not correspond to the constituent features. Conversely, even if the embodiment is described here as an embodiment that corresponds to the invention, it does not mean that the embodiment does not correspond to features other than the constituent features.

Figure 7:
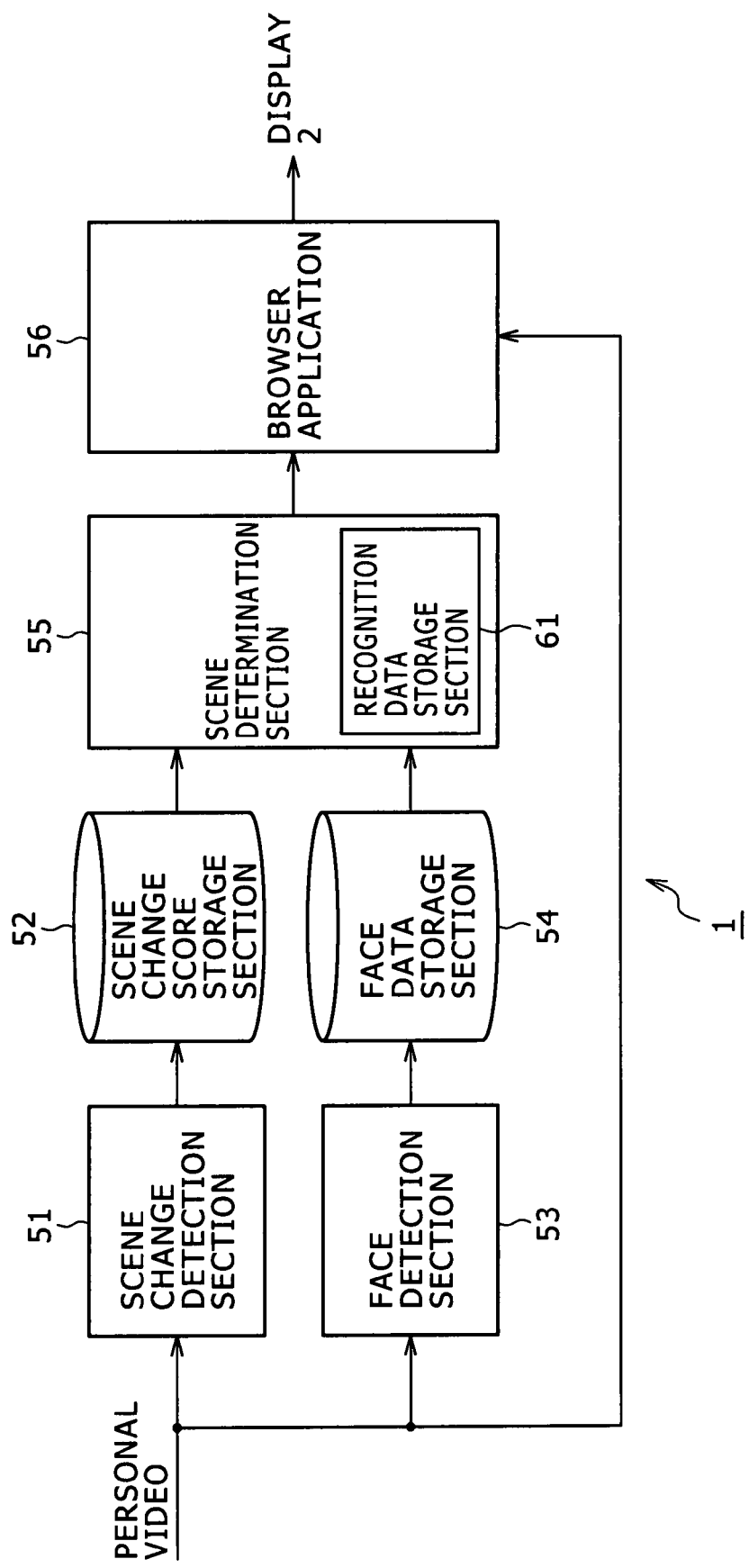
FIG. 7 is a block diagram illustrating a typical functional configuration of the image processing apparatus.

An image processing apparatus (e.g., an image processing apparatus 1 in FIG. 2) according to an embodiment of the present invention includes: scene change detection means (e.g., a scene change detection section 51 in FIG. 7), object detection means (e.g., a face detection section 53 in FIG. 7), and determining means (e.g., scene determining section 55 in FIG. 7). The scene change detection means detects a scene change in a motion picture. The object detection means detects a predefined object that is contained as a subject in still pictures constituting the motion picture. The determining means determines, in accordance with the result of a detection operation that is performed by the object detection means in relation to still pictures constituting a predefined scene between a scene change detected by the scene change detection means and a chronologically adjacent scene change, whether the predefined scene contains a still picture containing the predefined object as a subject.

The image processing apparatus may further include storage means (e.g., a recognition data storage section 61 in FIG. 7), which stores a first model that is derived from a result of the same detection operation that is performed by the object detection means in relation to still pictures constituting a scene containing a still picture containing the predefined object as a subject and will be used as recognition information for pattern recognition by the determining means.

The image processing apparatus may further include reproduction means (e.g., a browser application 56 in FIG. 7), which reproduces scenes of the motion picture that are determined by the determining means to contain a still picture containing the predefined object as a subject.

An image processing method or program according to an embodiment of the present invention includes the steps (e.g., step S8 in FIG. 16) of: detecting a scene change in a motion picture; detecting a predefined object that is contained as a subject in still pictures constituting the motion picture; and determining, in accordance with the result of a detection operation that is performed to detect the predefined object in still pictures constituting a predefined scene between a detected scene change and a chronologically adjacent scene change, whether the predefined scene contains a still picture containing the predefined object as a subject.

An embodiment of the present invention will be described below with reference to the accompanying drawings.

Figure 1:
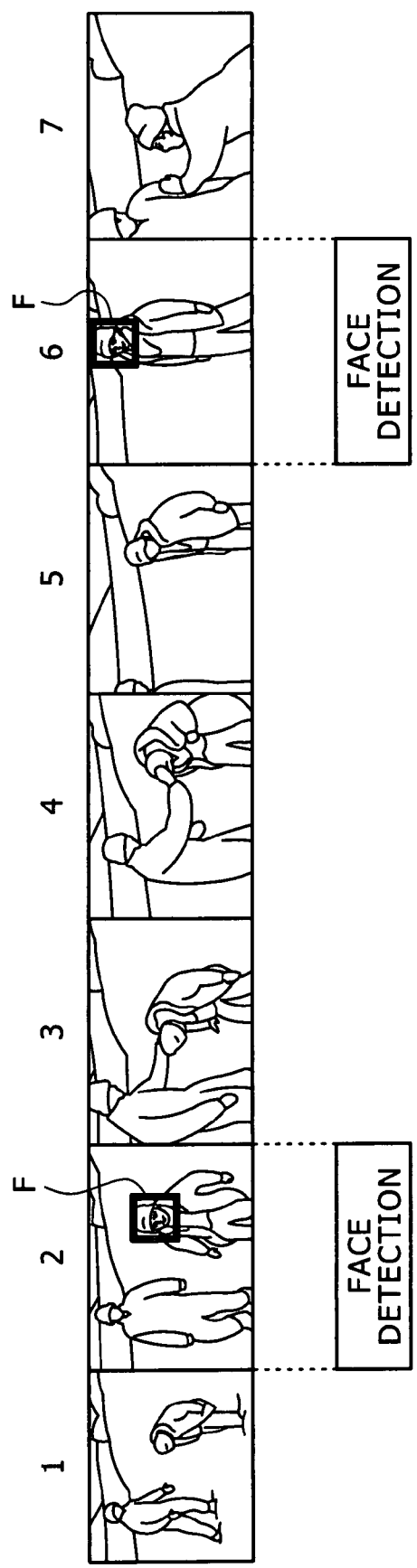
FIG. 1 shows an example illustrating the results of face detection.
Figure 2:
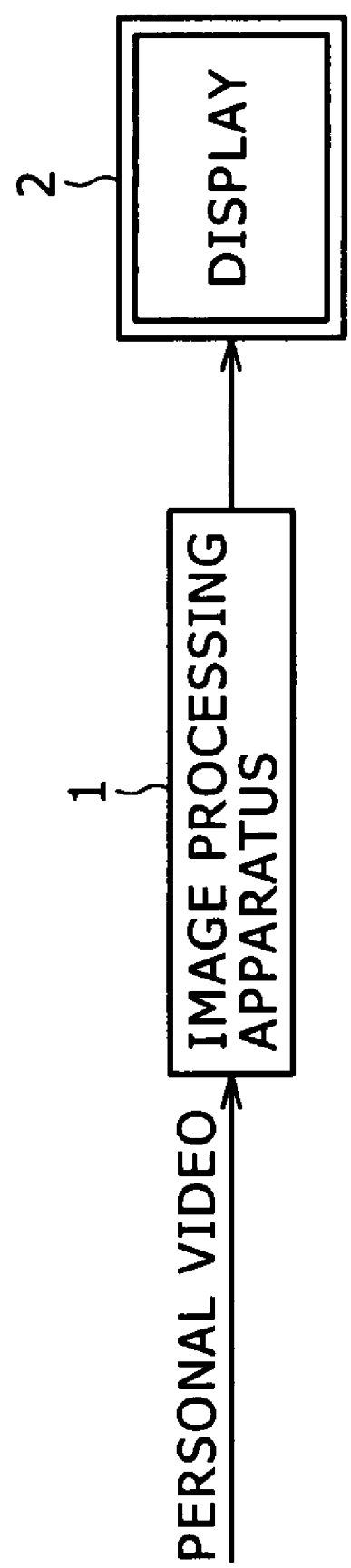
FIG. 2 shows an image processing apparatus according to an embodiment of the present invention, and a display that is connected to the image processing apparatus.

FIG. 2 shows an image processing apparatus 1 according to an embodiment of the present invention, and a display 2 that is connected to the image processing apparatus 1.

The image processing apparatus 1 detects faces of humans that are imaged as subjects in personal video supplied from the outside, and determines whether a predefined object is visible in individual scenes. For example, the image processing apparatus 1 determines whether individual scenes contain a still picture in which the face of a person is visible, a still picture in which the faces of many persons (e.g., five or six persons) are visible, or a still picture showing a close-up of the face of a person. A scene containing a still picture in which the face of a person is visible is hereinafter referred to as a face scene. A scene containing a still picture in which the faces of many persons are visible is hereinafter referred to as a group scene. A scene containing a still picture showing a close-up of the face of a person is hereinafter referred to as a zoom scene.

Here, the personal video is a motion picture that an ordinary user has personally shot by using a motion picture shooting function incorporated in a camcorder, digital still camera, cellular phone, or other apparatus. Therefore, the personal video differs from a television broadcast program, movie, or other public motion picture shot by a professional cameraman because, for instance, the images contained in the personal video are often blurred due to the movement of a subject or the user's hands. A scene is a certain portion of personal video that contains a time series of still pictures (a motion picture) between a scene change at a particular position and a chronologically adjacent scene change within the entire motion picture.

The image processing apparatus 1 also detects scene changes in the personal video. In accordance with the results of scene change detection and face detection, the image processing apparatus 1 formulates the above determinations about individual scenes constituting the personal video.

Figure 3:
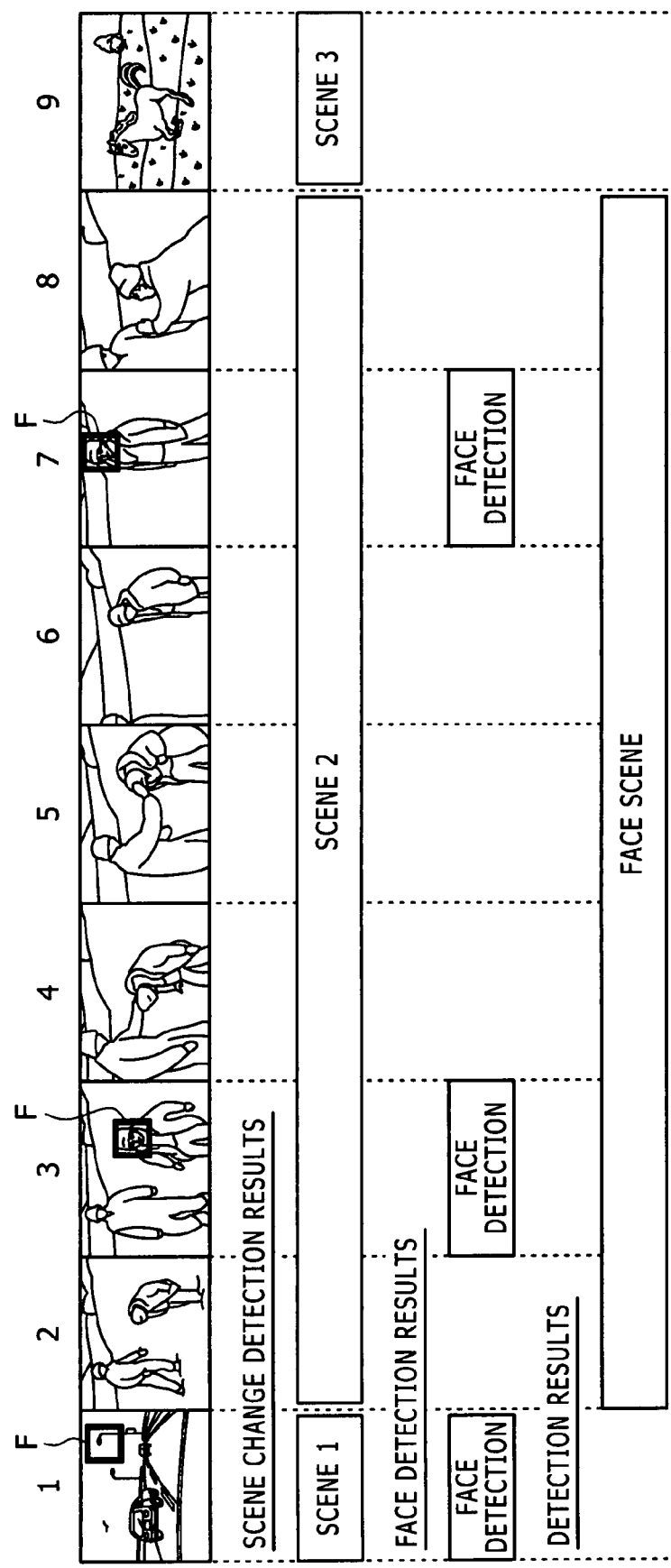
FIG. 3 shows an example illustrating scene determinations that are formulated by the image processing apparatus.

FIG. 3 shows an example illustrating scene determinations that are formulated by the image processing apparatus 1.

Images shown in FIG. 3 are numbered 1 to 9. These images are still pictures constituting personal video that is thinned by removing some frames. These still pictures are subjected to face detection. As far as processing is possible, all the still pictures constituting the personal video may be subjected to face detection without removing some frames for personal video thinning. For example, personal video that is not thinned by removing some frames is subjected to scene change detection.

In the example shown in FIG. 3, a scene change is detected between still pictures 1 and 2 and between still pictures 8 and 9. The personal video containing still pictures 1 to 9 is divided into three scenes (scenes 1 to 3). Still pictures 1, 3, and 7 are detected as still pictures in which a human face is visible. A square outline F that is superposed over still pictures 1, 3, and 7 represents portions that are detected as a human face by a face detection function of the image processing apparatus 1.

As regards the example shown in FIG. 3, the detection results obtained as described above indicate that scene 2 is determined as a face scene (a scene containing a still picture in which a human face is visible). Scene 3, which does not contain a still picture in which a human face is detected, and scene 1, which contains a still picture in which a human face is detected, are both determined to be a non-face scene.

Even when a scene contains a still picture in which a face is detected, it may not be determined as a face scene. The reason is that the image processing apparatus 1 does not formulate a determination depending merely on whether a scene contains a still picture in which a face is detected. The image processing apparatus 1 checks individual scenes for a face scene by performing pattern recognition, which is achieved by using the position of a face detected in still pictures constituting a face scene, the area of a detected face, and other modeled data derived from a time series of features obtained from still pictures constituting a face scene, and the information about the position and area of a portion that is detected as a face from still pictures constituting a determination target scene.

Figure 4:
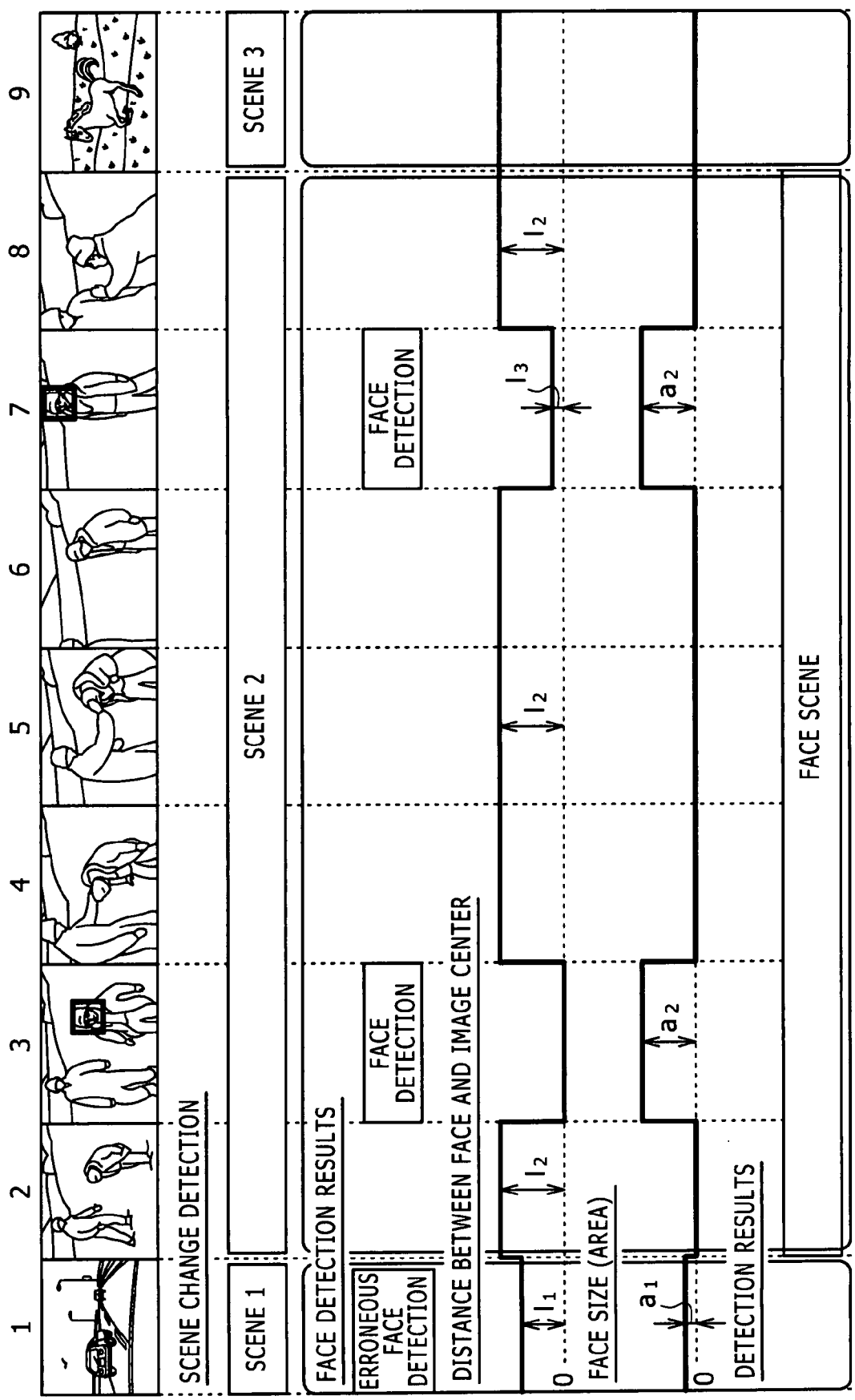
FIG. 4 shows an example that illustrates a scene determination process in more details.

FIG. 4 shows an example that illustrates a scene determination process in more details.

Two waveforms are shown in the example to indicate the results of face detection. One waveform depicts the distance between the still picture center and a portion detected as a human face. The other waveform depicts the area of the portion detected as a human face. In other words, when the image processing apparatus 1 checks a still picture for face detection, it not only checks for a face but also detects the distance between the still picture center and the portion detected as a human face and the area of the detected portion.

As regards the results of face detection in FIG. 4, the distance between the center of still picture 1 and the portion detected as a human face in still picture 1 is distance $l_1$, and the area of the detected portion is area $a_1$.

A portion detected as a face in still picture 3 is positioned at a distance of zero (0) from the center of still picture 3, which is shorter than distance $l_1$ (a face is detected at the center of still picture 3), and the area of the detected portion is area $a_2$, which is larger than area $a_1$.

Similarly, the distance between a portion detected as a face in still picture 7 and the center of still picture 7 is distance $l_3$, which is shorter than distance $l_1$, and the area of the detected portion is area $a_2$.

If no face is detected, the distance is output as distance $l_2$, and the area is output as zero (0), as indicated in FIG. 4.

For example, scene 1 is not determined as a face scene because the distance to the portion detected as a face is far and its area is small. The image processing apparatus 1 handles the face detected in still picture 1 as a result of erroneous detection in which a non-face portion is erroneously detected.

Meanwhile, scene 2 is determined as a face scene because it contains still pictures 3 and 7 in which a face is detected at a position close to the image center and the area of the detected face is large.

Scene 3 is not determined as a face scene because no face is detected in still picture 9, which is contained in scene 3.

When still pictures are subjected to face detection, a non-face portion may be erroneously detected as a face. Therefore, modeled data derived from a time series of features obtained from still pictures constituting a face scene is used, for instance, to determine whether a portion derived from a still picture as a result of detection is a human face. This makes it possible to avoid a situation where a scene in which no human face is visible or a human face is momentarily visible at an end of a frame is determined as a face scene.

If a scene is individually determined as a face scene depending merely on whether it contains a still picture in which a face is detected, and without formulating a determination in accordance, for instance, with modeled data derived from a time series of features obtained from still pictures constituting a face scene, scene 1, which contains still picture 1, is erroneously determined as a face scene. In the examples shown in FIGS. 3 and 4, no human face is visible in still picture 1, and a non-face portion is detected as a human face.

Further, a determination is formulated on an individual scene basis. This makes it possible to avoid a situation where different determination results are obtained at short time intervals to produce inconsistent determination results. Therefore, when the determination results are presented to prompt the user to select a reproduction or editing portion from the entire motion picture, a simple determination result presentation screen is presented, thereby allowing the user to select an easy-to-handle unit of motion picture.

If determination results are called for on an individual still picture basis instead of an individual scene basis, different determination results are obtained separately. For example, the obtained determination results may indicate that a portion between still pictures 1 and 2 is a face portion, and that a portion between still pictures 2 and 3 is a non-face portion, and further that a portion between still pictures 3 and 4 is a face portion.

For example, the video to be processed by the image processing apparatus 1 is personal video that an ordinary user has personally shot. Therefore, even when a particular scene is shot, the face of a human subject may not be positioned within a frame due, for instance, to camera shake. Thus, the human subject imaged within the personal video are more frequently displaced than those imaged in a television broadcast program or movie. Consequently, when determinations are formulated on an individual scene basis by using modeled data derived from features of a scene (still pictures constituting a scene) in which a human face is visible, it is possible to avoid a situation where the determination results are directly affected by camera shake.

The distance between a portion detected as a face and the center of a still picture and the area of the detected portion are used to determine whether a portion detected in a face detection process is a human face. The reason is that when an ordinary user shoots a human subject, he/she frequently selects such a picture composition as to position the face of the human subject near the center of an imaging area and moves toward the face of the human subject.

Modeled data derived from a time series of features obtained from still pictures constituting a group scene, face detection results, and other relevant data are used similarly to determine whether individual scenes are group scenes (scenes containing a still picture in which the faces of many persons are visible). Still pictures constituting a group scene are characterized, for instance, by the fact that a plurality of faces of a predetermined size are detected at positions near the center of a still picture.

Modeled data derived from a time series of features obtained from still pictures constituting a zoom scene, face detection results, and other relevant data are used similarly to determine whether individual scenes are zoom scenes (scenes containing a still picture showing a close-up of the face of a person). Still pictures constituting a zoom scene are characterized, for instance, by the fact that a face having a large area is detected at a position near the center of a still picture.

Returning to FIG. 2, when, for instance, the scenes constituting personal video are completely determined, the image processing apparatus 1 causes the display 2 to indicate the ranges of a face scene, a group scene, and a zoom scene in accordance with the determination results.

The image processing apparatus 1 reproduces a user-selected scene, displays the reproduced video on the display 2, and causes a speaker to output a sound.

The display 2 is, for example, an LCD (Liquid Crystal Display). It displays the information about scene ranges in accordance with a signal that is supplied from the image processing apparatus 1 via a cable or the like. The display 2 also displays an image of personal video and outputs a sound.

This enables the user to select and view only a desired scene instead of viewing all the scenes (face scenes, group scenes, and zoom scenes) of the entire personal video in chronological order.

Figure 5:
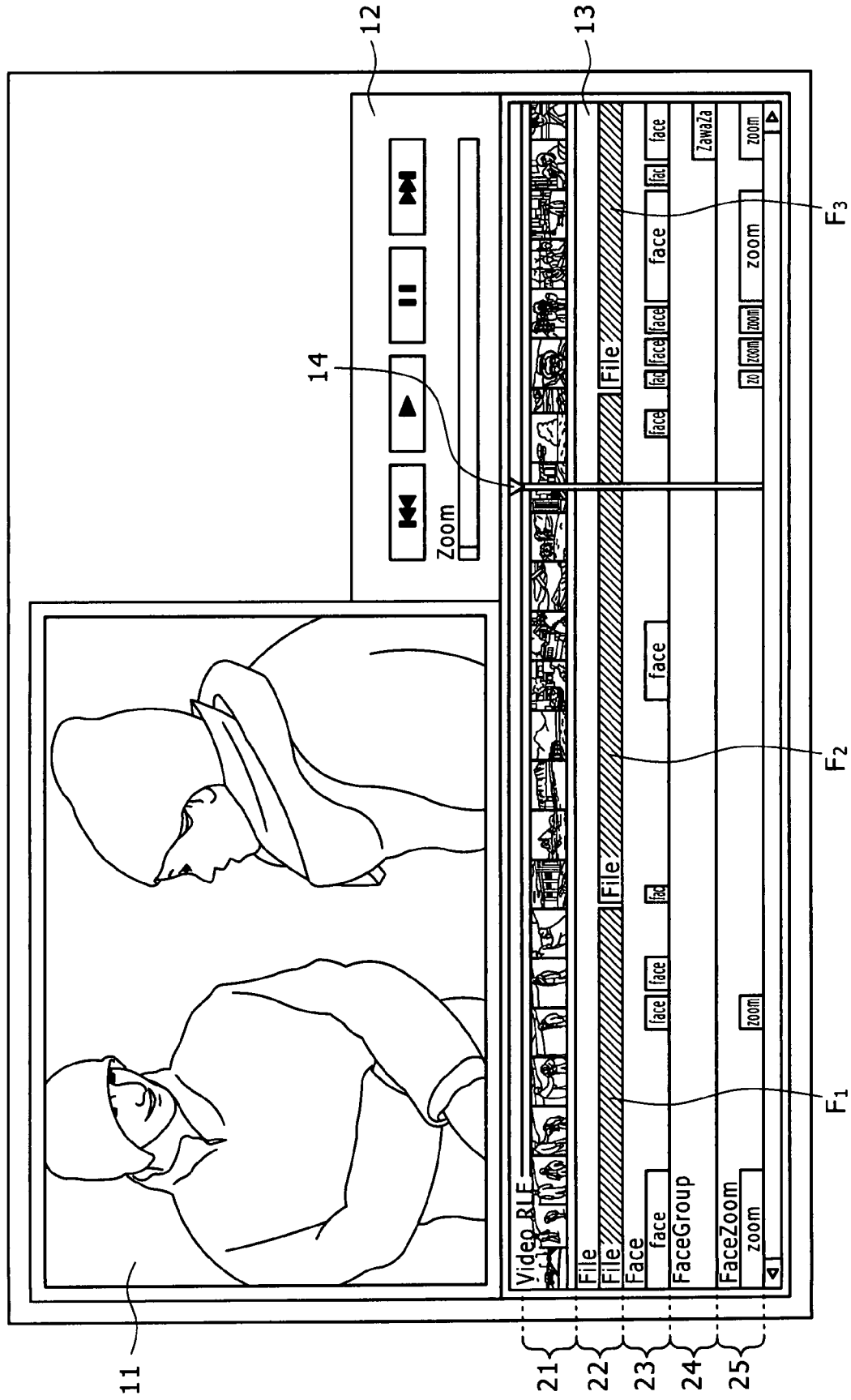
FIG. 5 shows the contents of a typical browser screen.

FIG. 5 shows a typical browser screen that appears on the display 2.

As shown in FIG. 5, the browser screen includes, for instance, an image display section 11, an operating control section 12, and a scene information display section 13. A pointer 14 appears in the scene information display section 13 to indicate the current reproduction position of the personal video.

The image display section 11 is an area that displays a reproduced image.

The operating control section 12 is an area that displays buttons and other controls to be operated by the user. The example in FIG. 5 shows a rewind button, which is operated for rewinding; a play button, which is operated to reproduce the personal video; a pause button, which is operated to halt a reproduction operation; and a fast-forward button, which is operated for fast-forwarding. A zoom bar is displayed beneath the above buttons. The zoom bar is operated to exercise zoom/tele control over the range (time) of personal video whose scene information is displayed in the scene information display section 13.

The scene information display section 13 is an area that displays a film roll and information strips (labels). The information strips indicate the ranges of various scenes within the entire personal video.

From top to bottom, the fields included in the scene information display section 13 are a film roll display field 21, a file information display field 22, a face scene information display field 23, a group scene information display field 24, and a zoom scene information display field 25.

In the film roll display field 21, miniature versions of still pictures constituting the personal video are arranged in the order of shooting. In the example in FIG. 5, still pictures displayed leftward are those which were shot earlier, whereas still pictures displayed rightward are those which were shot later.

The file information display field 22 displays information indicating a range of personal video that is managed by a file. When, for instance, different files are used to manage different sets of still pictures that were obtained by a single shooting session, the first file stores still pictures that were obtained between the start and end of the first shooting session, whereas the second file stores still pictures that were obtained between the start and end of the second shooting session.

In the example in FIG. 5, the file information display field 22 shows file information $F_1$, file information $F_2$, and file information $F_3$. A break between file information $F_1$ and file information $F_2$ represents the time at which the first shooting session ended and the time at which the second shooting session started. Further, a break between file information $F_2$ and file information $F_3$ represents the time at which the second shooting session ended and the time at which the third shooting session started.

The face scene information display field 23 displays face scene information, which is an information strip indicating the range of a face scene. The group scene information display field 24 displays group scene information, which is an information strip indicating the range of a group scene. The zoom scene information display field 25 displays zoom scene information, which is an information strip indicating the range of a zoom scene.

When, for instance, the user selects an information strip indicating the range of a face scene, group scene, or zoom scene, he/she can reproduce the associated scene within the personal video. The user can also select a face scene, group scene, or zoom scene and continuously reproduce the selected scene only.

Figure 6:
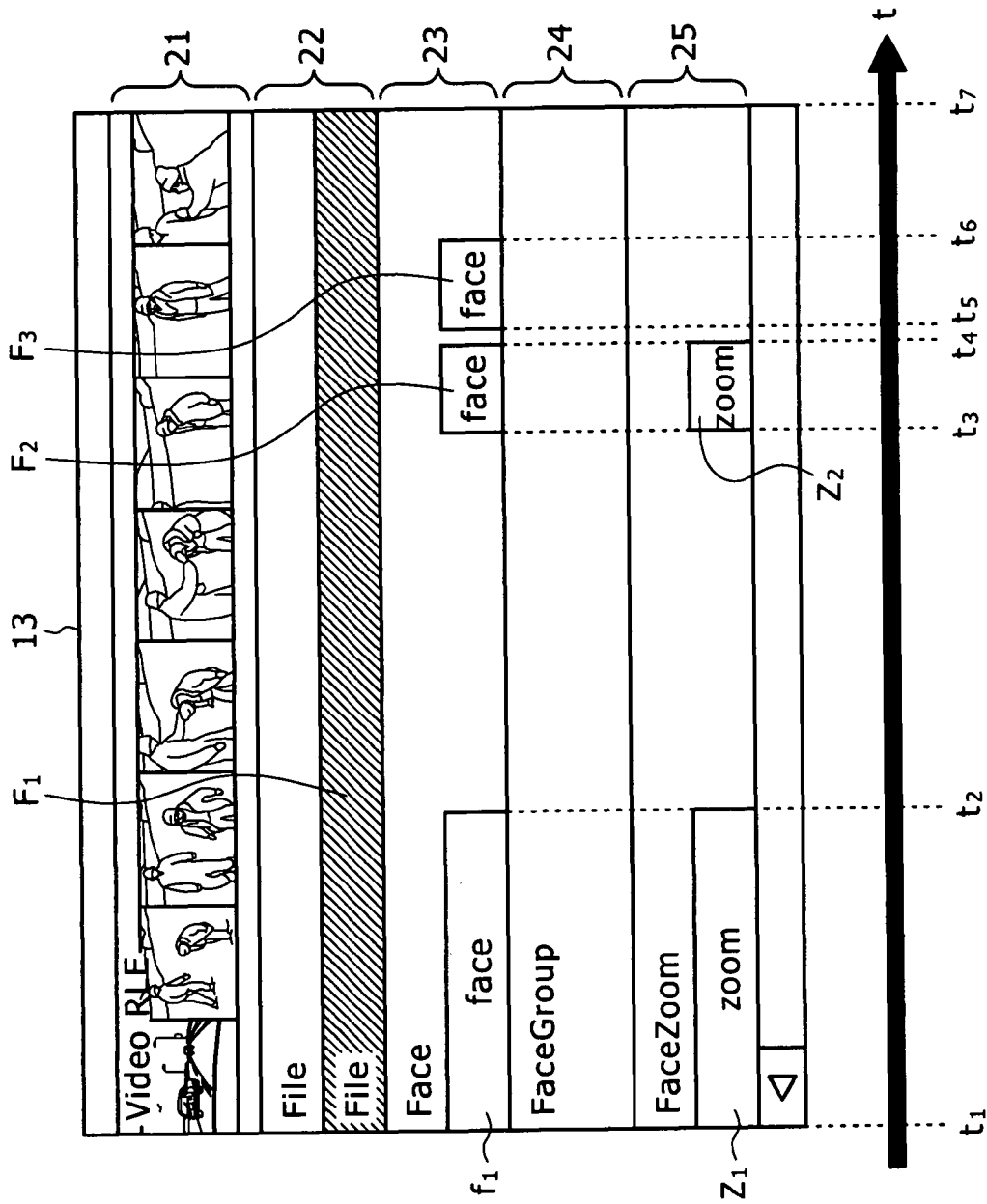
FIG. 6 is an enlarged view of a part of the browser screen shown in FIG. 5.

FIG. 6 relates to the scene information display section 13 shown in FIG. 5 and presents an enlarged view of an area where file information $F_1$ is displayed. In FIG. 6, time is indicated along a horizontal axis.

In an example in FIG. 6, file information $F_1$ is displayed between time $t_1$ and time t7. It means that the first shooting session was performed between time $t_1$ and time t7.

In the face scene information display field 23 shown in FIG. 6, face scene information $F_1$ is displayed between time $t_1$ and time $t_2$, and face scene information $F_2$ is displayed between time $t_3$ and time $t_4$. Further, face scene information $F_3$ is displayed between time $t_5$ and time $t_6$. These items of information indicate that a human face is visible in the scenes of the personal video that correspond to the ranges where face scene information $F_1$, face scene information $F_2$, and face scene information $F_3$ are displayed.

In the group scene information display field 24, no group scene information is displayed. It means that no group scene is included in the personal video that was shot during the first shooting session.

In the zoom scene information display field 25, zoom scene information $Z_1$ is displayed between time $t_1$ and time $t_2$, and zoom scene information $Z_2$ is displayed between time $t_3$ and time $t_4$. These items of information indicate that a close-up of a human face is included in the scenes of the personal view that correspond to the ranges where zoom scene information $Z_1$ and zoom scene information $Z_2$ are displayed.

The image processing apparatus 1 performs a check on an individual scene basis to determine whether a scene is a face scene, group scene, or zoom scene, and displays the browser screen in accordance with the determination results. Therefore, hashed labels will not be displayed at a granularity higher than that of a scene, as indicated in FIGS. 5 and 6.

The operations that the image processing apparatus 1 performs for scene determination and screen display will be described later with reference to flowcharts.

FIG. 7 is a block diagram illustrating a typical functional configuration of the image processing apparatus 1.

As shown in FIG. 7, a scene change detection section 51, a scene change score storage section 52, a face detection section 53, a face data storage section 54, a scene determining section 55, and a browser application 56 are implemented in the image processing apparatus 1. The scene determining section 55 includes a recognition data storage section 61. All the functional sections shown in FIG. 7 may be implemented by means of hardware except for the browser application 56. Alternatively, the functional sections may be implemented by means of software, that is, by allowing the image processing apparatus 1 to execute predetermined programs.

The scene change detection section 51 detects a scene change in the supplied personal video. Scene change detection is achieved in accordance, for instance, with a brightness value difference between chronologically adjacent frames, a motion vector indicating the movement of a subject, the difference between motion-compensated frames, and a color histogram difference. A scene change detection result is produced, for instance, as a score. An inter-frame position at which the achieved score is higher than a predetermined threshold value is detected as a scene change position.

The scene change detection section 51 not only causes the scene change score storage section 52 to store a scene change score that is achieved as a result of detection, but also determines, with predetermined timing, a scene change position in accordance with the score stored in the scene change score storage section 52, and generates scene change data, which is the information indicating the start position (start time) and end position (end time) of each scene within the entire personal video. The scene change detection section 51 causes the scene change score storage section 52 to store the generated scene change data.

The scene change score storage section 52 stores scene change scores and scene change data that are supplied from the scene change detection section 51. The scene determining section 55 reads as necessary the scene change data stored in the scene change score storage section 52.

Figure 8:
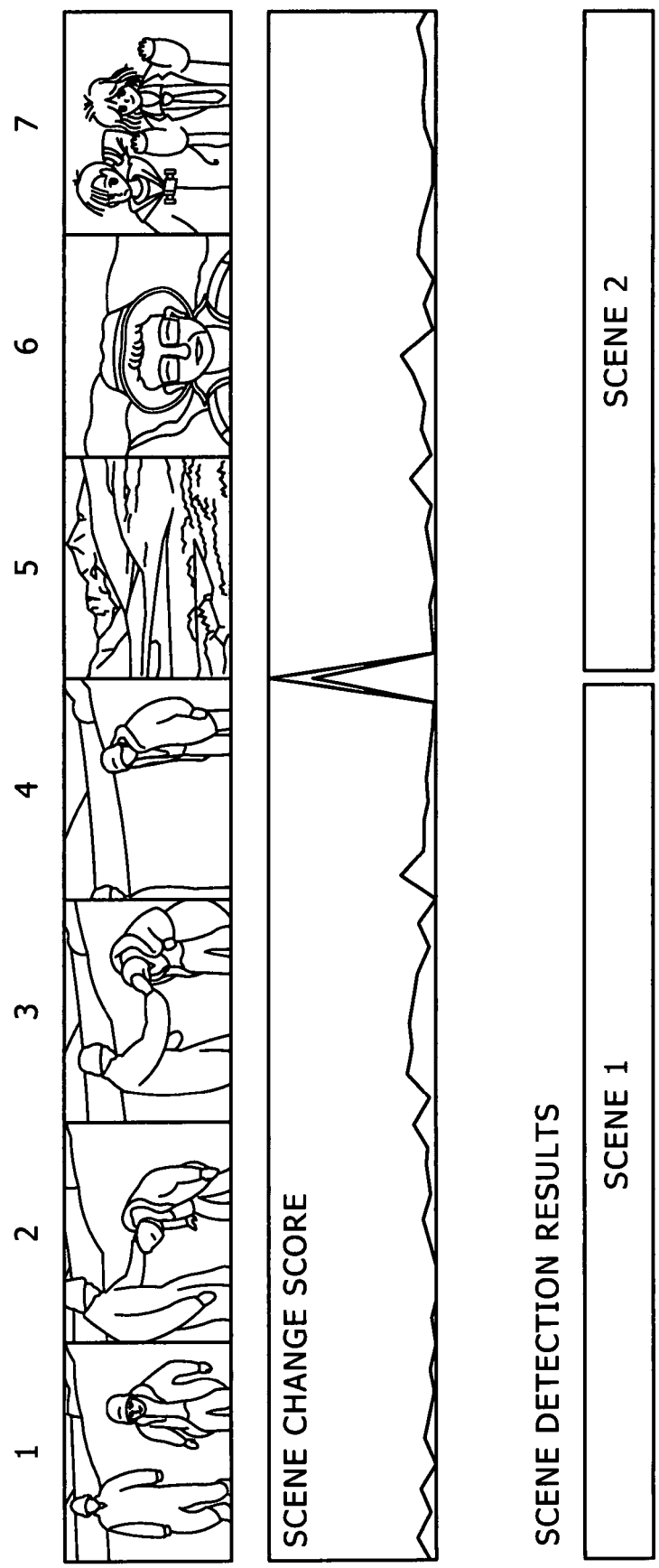
FIG. 8 shows an example of scene change detection.

FIG. 8 shows an example of scene change detection.

In the upper part of FIG. 8, still pictures 1 to 7, which constitute the personal video targeted for scene change detection, are arranged in the order of shooting. A waveform is shown below the still pictures to indicate a scene change score, which is the result of scene change detection.

In the example shown in FIG. 8, the scene change score achieved between still pictures 4 and 5 is higher than the threshold value. As indicated in the lower part of FIG. 8, the position between still pictures 4 and 5 is detected as a scene change position. Still pictures 1 to 4 constitute scene 1, whereas still pictures 5 to 7 constitute scene 2.

Figures 9, 10:
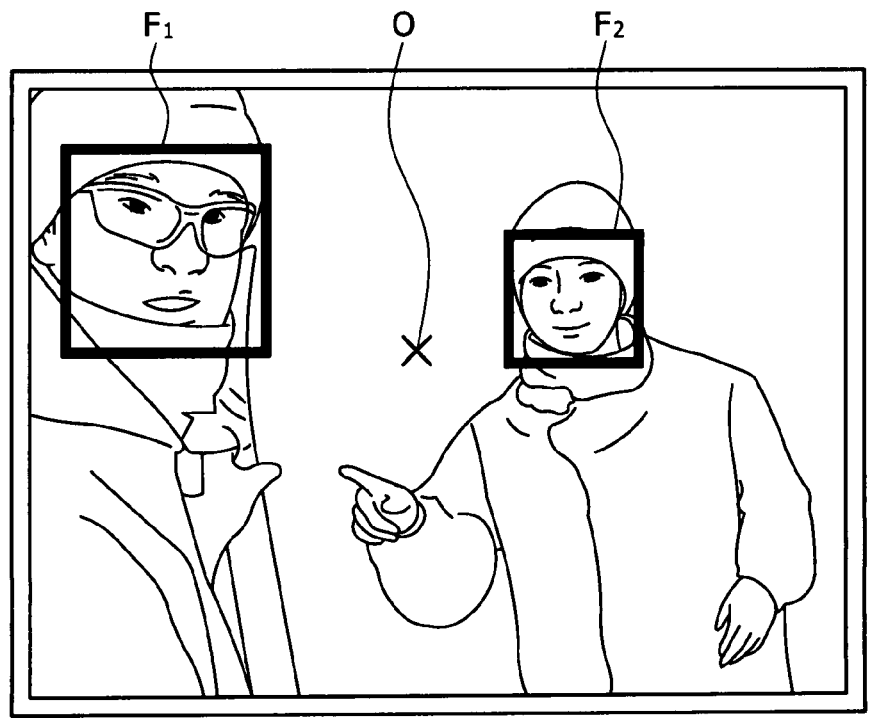
FIG. 9 shows an example of scene change data.
FIG. 10 shows an example of a still picture that is targeted for face detection.

FIG. 9 shows an example of scene change data that is generated from the scene change detection results shown in FIG. 8.

In the example shown in FIG. 9, the start time and end time for scene 1, which is a scene between still pictures 1 and 4 in FIG. 8, are "0.0" and "100.0", respectively. The start time and end time for scene 2, which is a scene between still pictures 5 and 7, are "100.0" and "180.0", respectively.

As regards scenes 3 and beyond, which are also included in the personal video, their start time and end time are similarly written as scene change data.

The scene change data, which is structured as described above, is used, for instance, to determine whether individual scenes are face scenes. The scene change data may be generated collectively after the score for the entire personal video is determined. Alternatively, the scene change data may be generated whenever a scene change is detected as a result of threshold processing that is sequentially performed in accordance with a determined score.

The threshold value for scene change determination may be changed by the user. This enables the user to set a desired granularity for a scene.

Returning to FIG. 7, the face detection section 53 performs a face detection process on still pictures constituting the supplied personal video or still pictures constituting the personal video from which some frames are removed for thinning purposes. The face detection section 53 detects a face in accordance with the size and shape of a skin tone area within a still picture or with the information derived from a statistic model of face density patterns existing in the personal video, and generates face data, which is the information indicating the number of faces, the face position relative to a still picture center, and the area of a face. The face detection section 53 causes the face data storage section 54 to store the generated face data.

The face data storage section 54 stores the face data generated by the face detection section 53. The face data stored in the face data storage section 54 is read as necessary by the scene determining section 55 and used for scene determination.

FIG. 10 shows an example of a still picture that is targeted for face detection.

In the still picture shown in FIG. 10, two human faces are visible at positions that are slightly away from the center O. One is positioned at the left and above the center O and the other is positioned at the right and above the center O. When a face detection process is performed on this still picture, two faces are detected as indicated by outline boxes $F_1$ and $F_2$.

FIG. 11 shows an example of face data, which indicates the results of a face detection process that was performed on the still picture shown in FIG. 10.

As indicated in FIG. 11, the face data includes the information about a face count, face position, and face area. In the example shown in FIG. 11, the face count is "2."

The two detected faces are at positions "(−0.7, 0.5)" and "(0.2, 0.4)", respectively, relative to the center O of the still picture. In this example, which assumes that the rightmost and leftmost end positions of the still picture shown in FIG. 10 are 1.0 and −1.0, respectively, and that the uppermost and lowermost end positions of the still picture are 1.0 and −1.0, respectively, the position of an outline box that encloses a detected face is detected.

The areas of the two faces are "0.25" and "0.11", respectively, on the assumption that a predefined reference size is 1.

The face data, which includes the above information, is generated each time a face detection process is performed on still pictures constituting the personal video, and stored in the face data storage section 54. When a face detection process is performed while the target still picture is changed in the order of shooting, the face data storage section 54 stores time-series data about the face count (e.g., "2", "1", "0", . . . ), time-series data about the face position (e.g., "(0.2, 0.4)", "(0.1, 0.3)", "(0, 0.2)", . . . ), and time-series data about the face area (e.g., "0.25", "0.20", "0.15", . . . ).

Alternatively, features other than the face count, face position, and face area may be detected during the face detection process to formulate a face/group/zoom scene determination in accordance with such detected features.

Returning to FIG. 7, the scene determining section 55 reads the scene change data stored in the scene change score storage section 52 and the face data stored in the face data storage section 54, and determines, in accordance with the read data and the recognition data stored in the recognition data storage section 61, whether individual scenes are face scenes, group scenes, or zoom scenes. The obtained determination results are output to the browser application 56.

The recognition data storage section 61 stores in advance a face scene HMM (Hidden Markov Model) and a non-face scene HMM. The face scene HMM is generated on the basis of face data (the information about a face count, face position, and face area) that is obtained when still pictures constituting a scene that is recognized as a face scene by the human eye are subjected to a face detection process in the order of shooting. The non-face scene HMM is generated on the basis of face data that is obtained when still pictures constituting a scene that is recognized as a non-face scene by the human eye are subjected to a face detection process in the order of shooting. The face scene HMM and non-face scene HMM are used to determine whether or not individual scenes are face scenes.

Further, the recognition data storage section 61 stores in advance a group scene HMM and a non-group scene HMM. The group scene HMM is generated on the basis of face data that is obtained when still pictures constituting a scene that is recognized as a group scene by the human eye are subjected to a face detection process in the order of shooting. The non-group scene HMM is generated on the basis of face data that is obtained when still pictures constituting a scene that is recognized as a non-group scene by the human eye are subjected to a face detection process in the order of shooting. The group scene HMM and non-group scene HMM are used to determine whether or not individual scenes are group scenes.

Furthermore, the recognition data storage section 61 stores in advance a zoom scene HMM and a non-zoom scene HMM. The zoom scene HMM is generated on the basis of face data that is obtained when still pictures constituting a scene that is recognized as a zoom scene by the human eye are subjected to a face detection process in the order of shooting. The non-zoom scene HMM is generated on the basis of face data that is obtained when still pictures constituting a scene that is recognized as a non-zoom scene by the human eye are subjected to a face detection process in the order of shooting. The zoom scene HMM and non-zoom scene HMM are used to determine whether or not individual scenes are zoom scenes.

An HMM generated on the basis of the information about only one item of information such as a face count, face position, or face area may be used for scene determination. In the present embodiment, however, the HMM generated on the basis of three items of information such as a face count, face position, and face area is used to increase the accuracy of scene determination.

Figure 12:
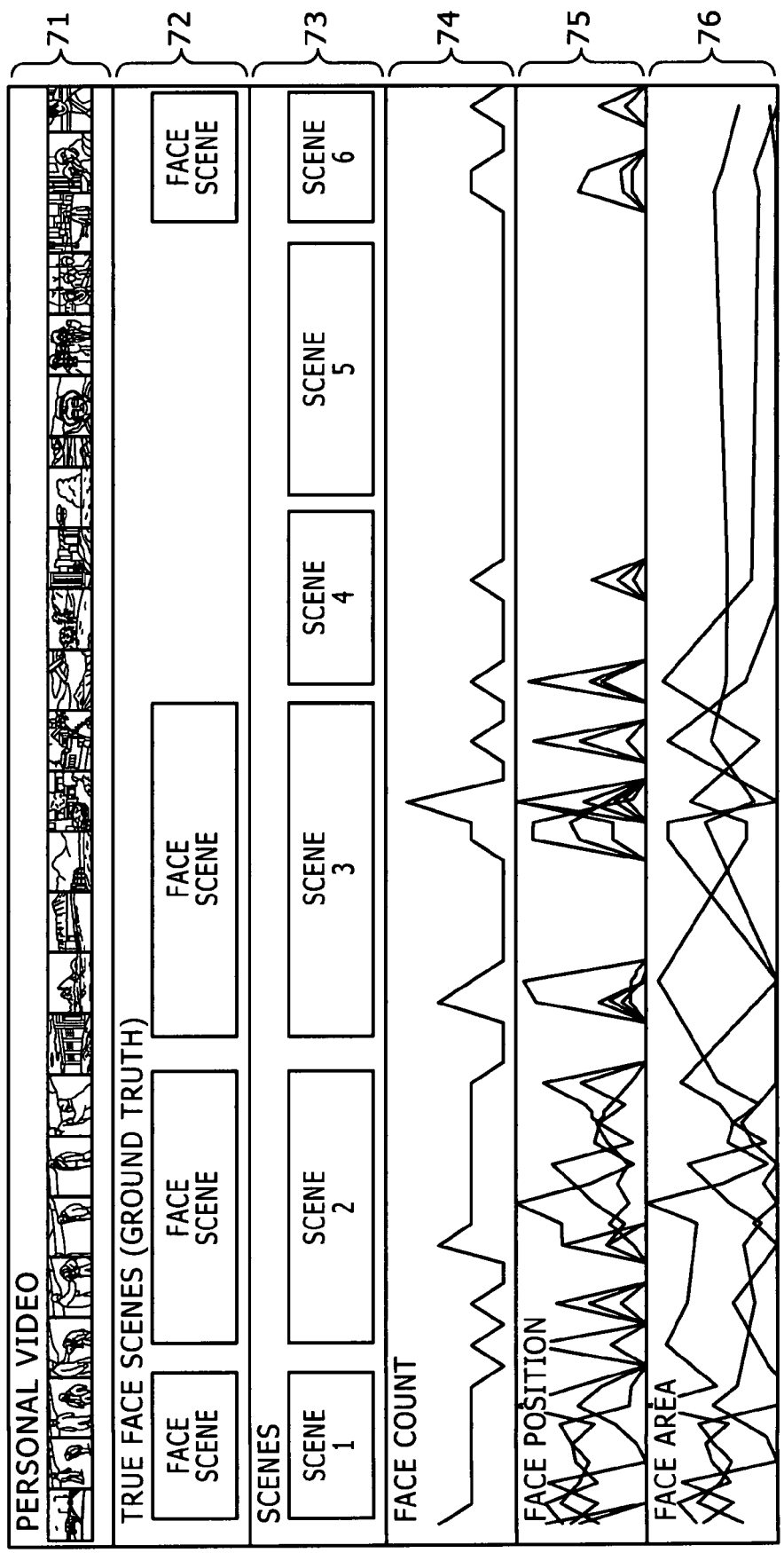
FIG. 12 is a diagram illustrating a face scene determination process.

FIG. 12 illustrates a face scene determination process.

Field 71 in FIG. 12 shows still pictures constituting the personal video that is targeted for face scene determination. Strips in field 72 indicate that a portion of the personal video corresponding to one of such strips is a scene recognized as a face scene by the human eye, that is, a true face scene (ground truth) to be determined by the scene determining section 55. A scene determination is formulated by the human before the scene determining section 55 of the image processing apparatus 1 performs a scene determination process, and the results of scene determination by the human are used for HMM generation.

Strips in field 73 indicate that a portion of the personal video corresponding to one of such strips is a scene defined by the results of scene change detection.

The waveform in field 74 indicates a face count that is determined when a face detection process is performed on the personal video shown in field 71. The waveform in field 75 indicates a face position that is determined when a face detection process is performed on the personal video shown in field 71. The waveform in field 76 indicates a face area that is determined when a face detection process is performed on the personal video shown in field 71. The information about a face count, face position, and face area, which is obtained when a face detection process is sequentially performed on target still pictures in the order of shooting, is time-series data as mentioned earlier. Therefore, these items of information are displayed as waveforms as indicated in FIG. 12.

In the example shown in FIG. 12, the entire personal video shown in field 71 is divided into six scenes (scenes 1 to 6) as indicated in field 73. Further, scenes 1, 2, 3, and 6 are determined by the human to be face scenes.

Figure 13:
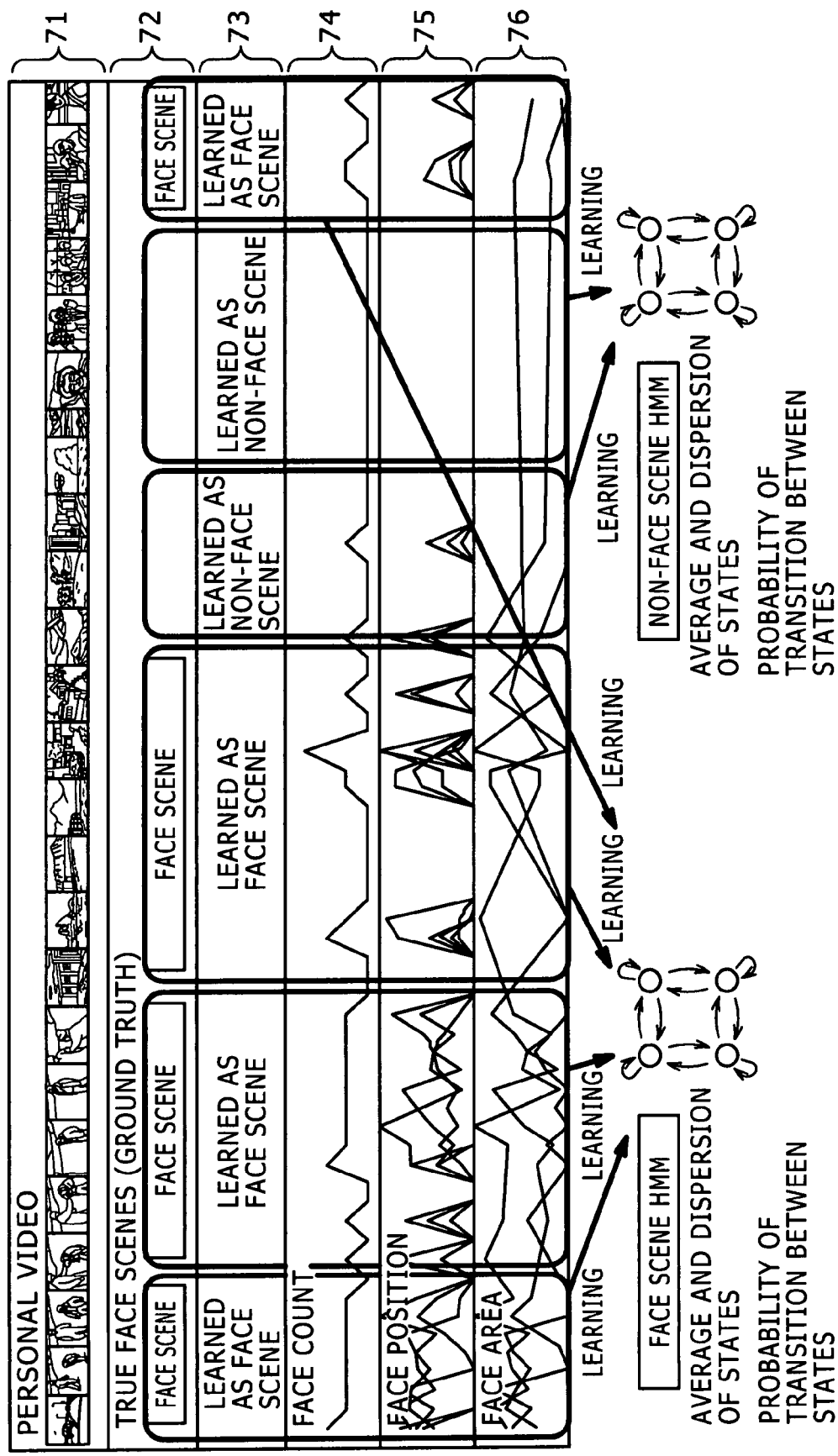
FIG. 13 is another diagram illustrating a face scene determination process.

When the above determination results and face data are obtained, learning is conducted to generate a face scene HMM in accordance with face data that is derived from still pictures constituting scenes 1, 2, 3, and 6, which are determined by the human to be face scenes, as indicated in FIG. 13.

Further, learning is conducted to generate a non-face scene HMM in accordance with face data that is derived from still pictures constituting scenes 4 and 5, which are determined by the human to be non-face scenes.

The HMM is a state transition probability model in which data is output in accordance with state transitions. It is defined by a probability with which the status changes from one state to another and a function indicating a probability distribution (average and dispersion) in which a transition destination state outputs data (an observed value).

Figure 14:
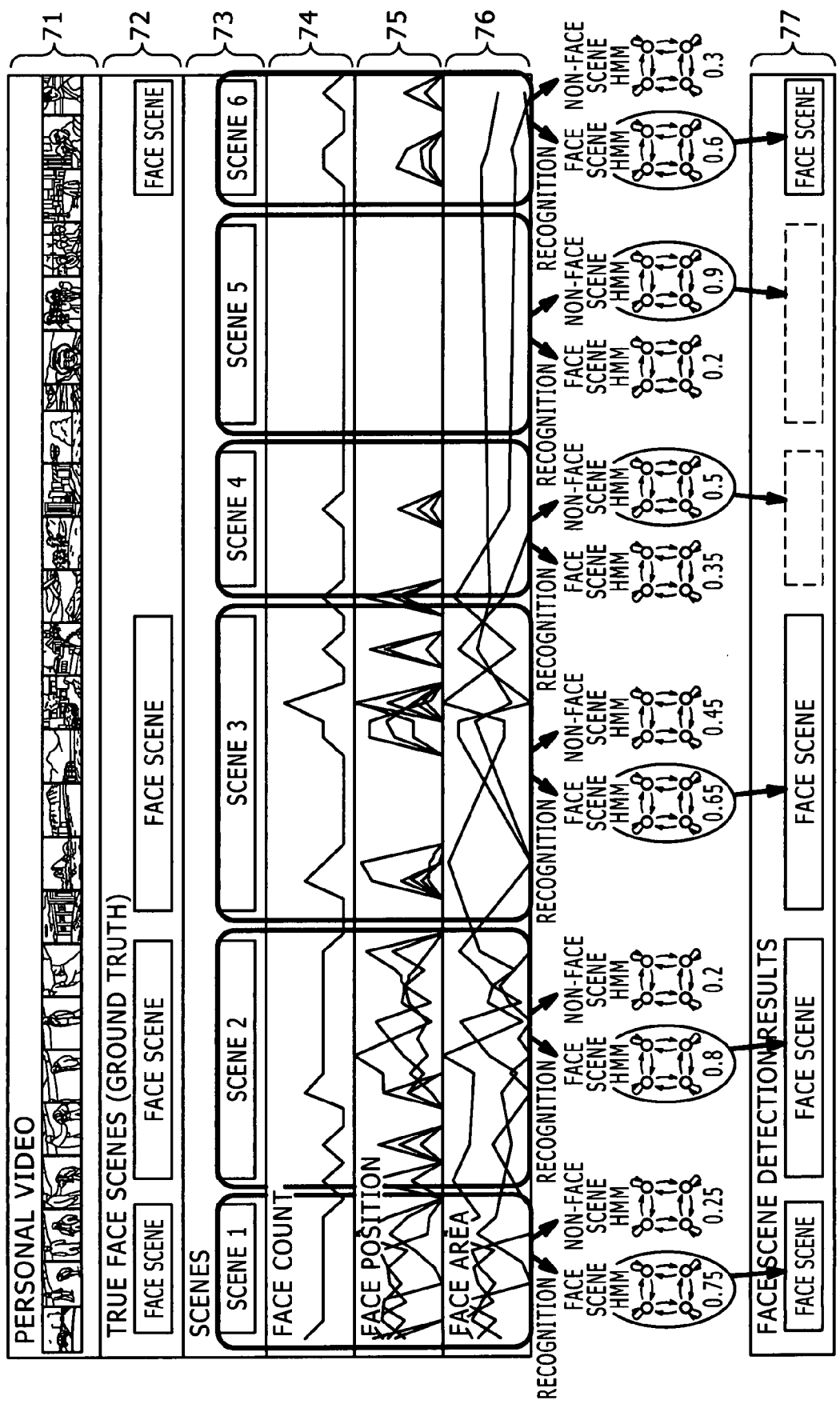
FIG. 14 is still another diagram illustrating a face scene determination process.

FIG. 14 illustrates a scene determination process that is performed by using a face scene HMM and non-face scene HMM.

As indicated in FIG. 14, a time series of face data derived from still pictures constituting each scene is input into the face scene HMM and non-face scene HMM. The score (probability) output from the face scene HMM is compared against the score output from the non-face scene HMM to determine which score is higher. The obtained comparison result is used to determine whether or not individual scenes are face scenes.

In the example shown in FIG. 14, the score output from the face scene HMM is 0.75 whereas the score output from the non-face scene HMM is 0.25 in a situation where a time series of face data derived from still pictures constituting scene 1 is input. These scores are compared to determine that scene 1 is a face scene, as indicated in field 77.

In a situation where a time series of face data derived from still pictures constituting scene 2 is input, the score output from the face scene HMM is 0.8 whereas the score output from the non-face scene HMM is 0.2. These scores are compared to determine that scene 2 is a face scene, as indicated in field 77.

In a situation where a time series of face data derived from still pictures constituting scene 3 is input, the score output from the face scene HMM is 0.65 whereas the score output from the non-face scene HMM is 0.45. These scores are compared to determine that scene 3 is a face scene, as indicated in field 77.

In a situation where a time series of face data derived from still pictures constituting scene 4 is input, the score output from the face scene HMM is 0.35 whereas the score output from the non-face scene HMM is 0.5. These scores are compared to determine that scene 4 is a non-face scene, as indicated in field 77.

In a situation where a time series of face data derived from still pictures constituting scene 5 is input, the score output from the face scene HMM is 0.2 whereas the score output from the non-face scene HMM is 0.9. These scores are compared to determine that scene 5 is a non-face scene, as indicated in field 77.

In a situation where a time series of face data derived from still pictures constituting scene 6 is input, the score output from the face scene HMM is 0.6 whereas the score output from the non-face scene HMM is 0.3. These scores are compared to determine that scene 6 is a face scene, as indicated in field 77.

The scene determining section 55 performs the above determination process in accordance with the face data stored in the face data storage section 54 and the HMMs stored in the recognition data storage section 61.

Figure 15:
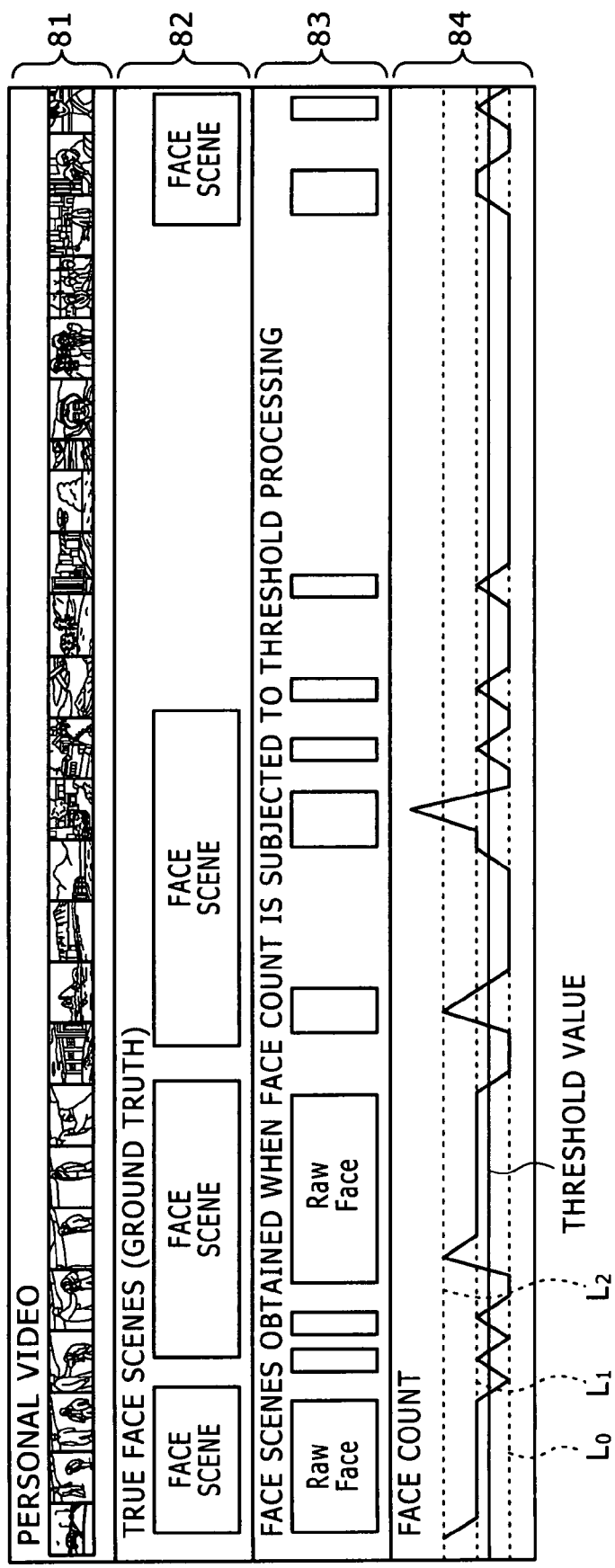
FIG. 15 shows typical determination results.

FIG. 15 shows typical determination results that are obtained without using the HMMs in a situation where a portion in which a face is detected is determined as a portion of motion picture in which a face is visible.

The images in field 81, which is shown in FIG. 15, are the same as the still pictures in field 71, which is shown in FIG. 12. The determination results shown in FIG. 15 are obtained when the targeted personal video is the same as in FIG. 12.

The face scene indications (ground truth) in field 82, which is shown in FIG. 15, are the same as those in field 72, which is shown in FIG. 12. The face-count-indicating waveform in field 84, which is shown in FIG. 15, is the same as the waveform in field 74, which is shown in FIG. 12.

In field 84, level Lo, which is indicated by a broken line, means that the face count is 0, level $L_1$ means that the face count is 1, and level $L_2$ means that the face count is 2.

As indicated by a solid line in field 84, which is shown in FIG. 15, a level that is higher than level $L_0$ and lower than level $L_1$ is set as a threshold value. When a portion in which the number of detected faces is greater than the threshold value is determined as a portion of motion picture in which faces are visible, portions of motion picture that are determined to contain a face are hashed pieces whose duration is short as indicated in field 83. On the other hand, when the HMMs are used to formulate a determination on an individual scene basis as described earlier, the determination results are not separated into pieces as indicated in field 77, which is shown in FIG. 14.

Here, a scene determination is formulated by performing threshold processing in accordance with the time-series data about the face count. However, the alternative maybe be provided to formulate a scene determination by performing threshold processing in accordance with the time-series data about the face position and face area.

Returning to FIG. 7, the browser application 56 causes the display 2 to open a browser screen that looks like FIG. 5. More specifically, the browser application 56 causes the scene information display section 13 in the browser screen to indicate the specific ranges of face, group, and zoom scenes within the entire personal video in accordance with the determination results supplied from the scene determining section 55. Further, when a certain scene is selected by the user, the browser application 56 reproduces the user-selected scene, which is within the supplied personal video, and causes the image display section 11 to display the image of the reproduced scene.

Operations performed by the image processing apparatus 1 will now be described with reference to flowcharts.

First of all, a face scene determination process that is performed by the image processing apparatus 1 will be described with reference to a flowchart in FIG. 16.

When the personal video is supplied from the outside in step S1, step S2 is performed to divide the supplied personal video into scene change detection video and face detection video. The scene change detection video is then supplied to the scene change detection section 51 and the face detection video is supplied to the face detection section 53. When the browser screen shown in FIG. 5 is to be opened, the personal video is also supplied to the browser application 56.

In step S3, the scene change detection section 51 performs a scene change detection process on the personal video and causes the scene change score storage section 52 to store the determined scene change score. Further, the scene change detection section 51 detects the position of a scene change from the scene change score stored in the scene change score storage section 52 and a threshold value with predetermined timing, and generates scene change data in which the scene start time and end time determined by the detected scene change are written. The generated scene change data is then stored in the scene change score storage section 52.

In step S4, the face detection section 53 performs a face detection process on still pictures constituting the personal video or still pictures constituting the personal video that is thinned by removing some frames. The face detection section 53 performs the face detection process while sequentially changing the target still picture in the order of shooting, and causes the face data storage section 54 to store face data that represents face detection results.

In step S5, the scene determining section 55 observes a scene whose start time and end time are written in the scene change data read from the scene change score storage section 52, and then proceeds to step S6.

In step S6, the scene determining section 55 accesses the face data storage section 54, reads a time series of face data derived from still pictures constituting the observed scene, enters the read time series of face data into the face scene HMM and non-face scene HMM, which are stored in the recognition data storage section 61, and determines the scores (by achieving recognition with the HMMs).

In step S7, the scene determining section 55 determines whether the score derived from the face scene HMM is higher than the score derived from the non-face scene HMM.

If the determination result obtained in step S7 indicates that the score derived from the face scene HMM is higher than the score derived from the non-face scene HMM, the scene determining section 55 proceeds to step S8 and determines that the observed scene is a face scene.

If, on the other hand, the determination result obtained in step S7 indicates that the score derived from the face scene HMM is lower than the score derived from the non-face scene HMM, the scene determining section 55 proceeds to step S9 and determines that the observed scene is not a face scene.

When the determination of the currently observed scene is finished, the scene determining section 55 proceeds to step S10 and determines whether all the scenes whose start time and end time are written in the scene change data have been observed. If the obtained determination result does not indicate that all the scenes have been observed, the scene determining section 55 returns to step S5, observes another scene, and repeats the subsequent processing steps.

If the determination result obtained in step S10 indicates that all the scenes have been observed, the scene determining section 55 terminates the process.

A group scene determination process that is performed by the image processing apparatus 1 will now be described with reference to a flowchart in FIG. 17.

Figure 16:
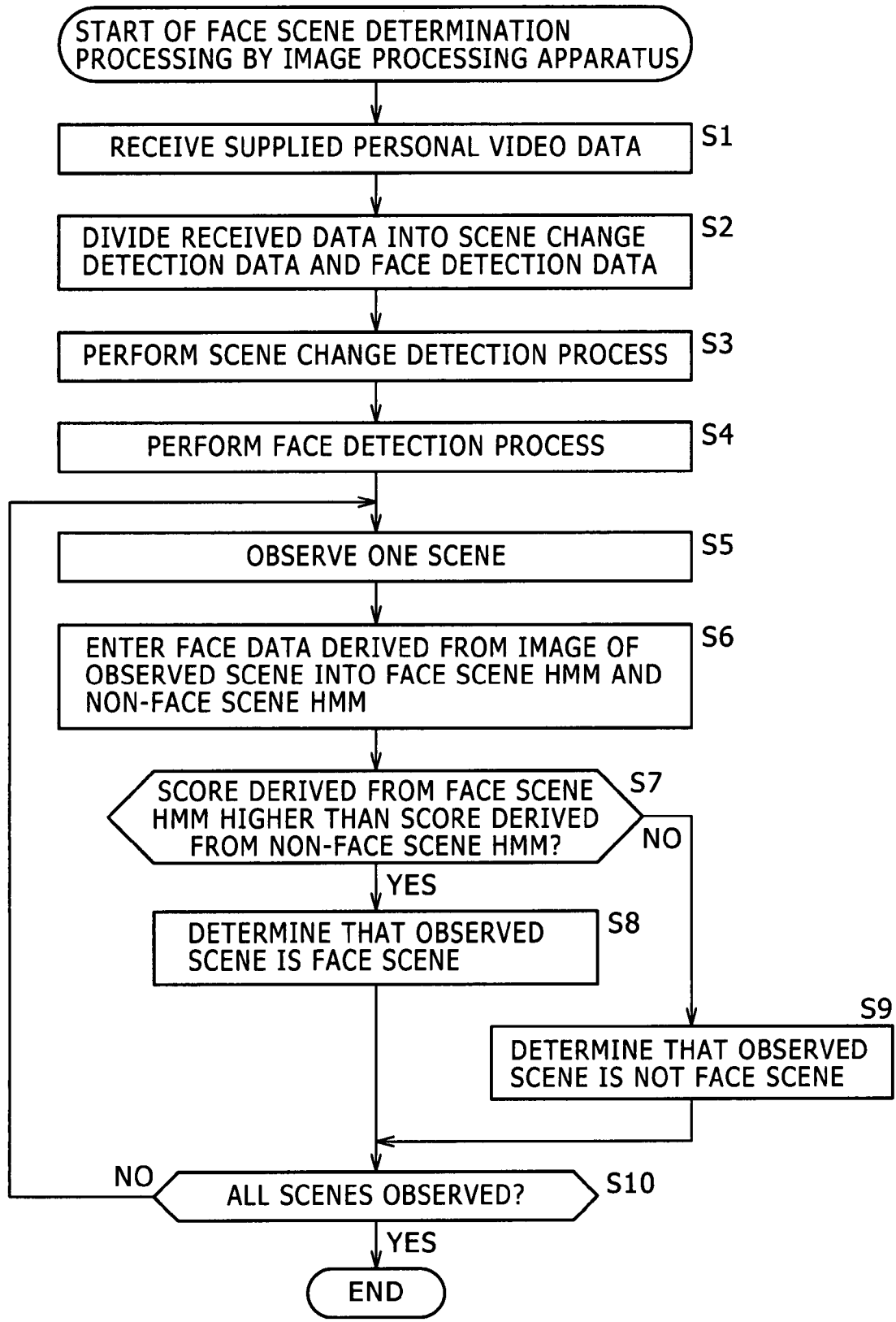
FIG. 16 is a flowchart illustrating a face scene determination process that is performed by the image processing apparatus.
Figure 17:
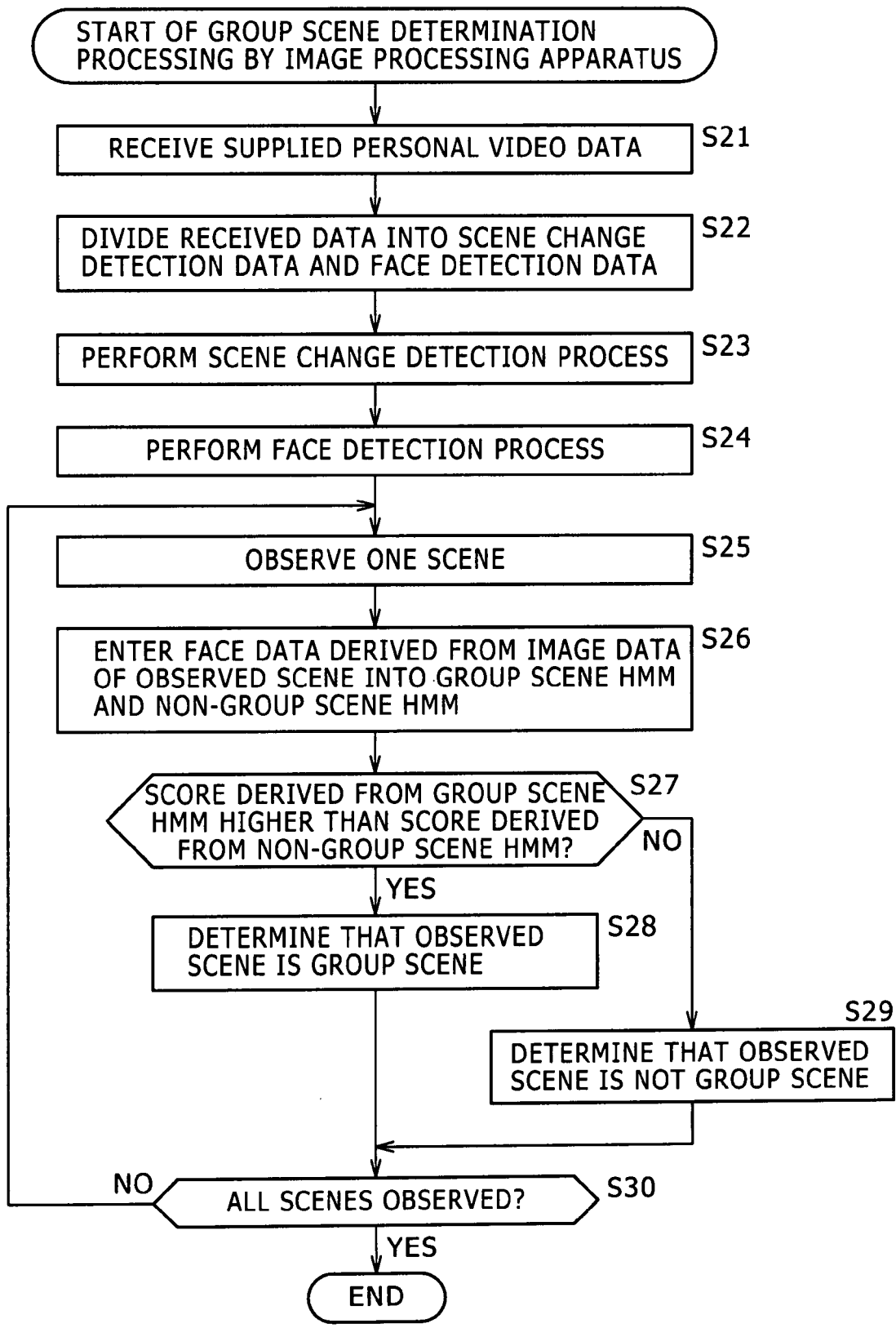
FIG. 17 is a flowchart illustrating a group scene determination process that is performed by the image processing apparatus.

Steps S21 to S25, which are shown in FIG. 17, are identical with steps S1 to S5, which are shown in FIG. 16. If some processing steps shown in FIG. 16 are already completed so that the scene change data derived from the personal video is stored in the scene change score storage section 52 with the face data stored in the face data storage section 54, steps 25 and earlier may be skipped.

When the personal video is supplied in step S21, step S22 is performed to divide the supplied personal video into scene change detection video and face detection video. The scene change detection video is then supplied to the scene change detection section 51 and the face detection video is supplied to the face detection section 53.

In step S23, the scene change detection section 51 performs a scene change detection process on the supplied personal video and causes the scene change score storage section 52 to store a scene change score and scene change data.

In step S24, the face detection section 53 performs a face detection process on still pictures constituting the personal video, and causes the face data storage section 54 to store the obtained face data.

In step S25, the scene determining section 55 observes a scene whose start time and end time are written in the scene change data read from the scene change score storage section 52, and then proceeds to step S26.

In step S26, the scene determining section 55 accesses the face data storage section 54, reads a time series of face data derived from still pictures constituting the observed scene, enters the read time series of face data into the group scene HMM and non-group scene HMM, which are stored in the recognition data storage section 61, and determines the scores.

In step S27, the scene determining section 55 determines whether the score derived from the group scene HMM is higher than the score derived from the non-group scene HMM.

If the determination result obtained in step S27 indicates that the score derived from the group scene HMM is higher than the score derived from the non-group scene HMM, the scene determining section 55 proceeds to step S28 and determines that the observed scene is a group scene.

If, on the other hand, the determination result obtained in step S27 indicates that the score derived from the group scene HMM is lower than the score derived from the non-group scene HMM, the scene determining section 55 proceeds to step S29 and determines that the observed scene is not a group scene.

When the determination of the currently observed scene is finished, the scene determining section 55 proceeds to step S30 and determines whether all the scenes have been observed. If the obtained determination result does not indicate that all the scenes have been observed, the scene determining section 55 returns to step S25, observes another scene, and repeats the subsequent processing steps.

If the determination result obtained in step S30 indicates that all the scenes have been observed, the scene determining section 55 terminates the process.

A zoom scene determination process that is performed by the image processing apparatus 1 will now be described with reference to a flowchart in FIG. 18.

Figure 18:
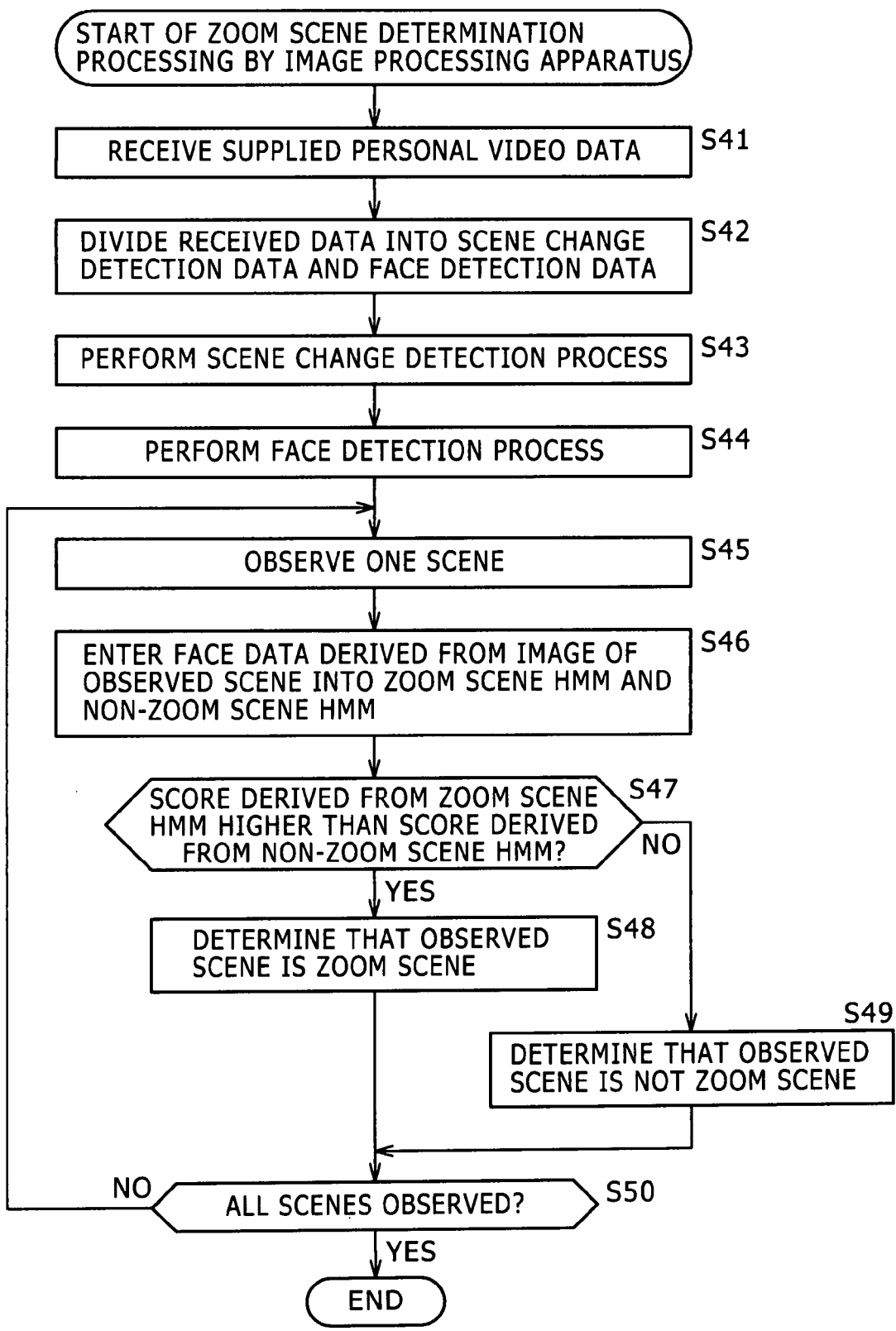
FIG. 18 is a flowchart illustrating a zoom scene determination process that is performed by the image processing apparatus.

Steps S41 to S45, which are shown in FIG. 18, are identical with steps S1 to S5, which are shown in FIG. 16. If some processing steps shown in FIG. 16 are already completed so that the scene change data derived from the supplied personal video is stored in the scene change score storage section 52 with the face data stored in the face data storage section 54, steps 45 and earlier may be skipped.

When the personal video is supplied in step S41, step S42 is performed to divide the supplied personal video into scene change detection video and face detection video. The scene change detection video is then supplied to the scene change detection section 51 and the face detection video is supplied to the face detection section 53.

In step S43, the scene change detection section 51 performs a scene change detection process on the supplied personal video and causes the scene change score storage section 52 to store a scene change score and scene change data.

In step S44, the face detection section 53 performs a face detection process on still pictures constituting the personal video, and causes the face data storage section 54 to store the obtained face data.

In step S45, the scene determining section 55 observes a scene whose start time and end time are written in the scene change data read from the scene change score storage section 52, and then proceeds to step S46.

In step S46, the scene determining section 55 accesses the face data storage section 54, reads a time series of face data derived from still pictures constituting the observed scene, enters the read time series of face data into the zoom scene HMM and non-zoom scene HMM, which are stored in the recognition data storage section 61, and determines the scores.

In step S47, the scene determining section 55 determines whether the score derived from the zoom scene HMM is higher than the score derived from the non-zoom scene HMM.

If the determination result obtained in step S47 indicates that the score derived from the zoom scene HMM is higher than the score derived from the non-zoom scene HMM, the scene determining section 55 proceeds to step S48 and determines that the observed scene is a zoom scene.

If, on the other hand, the determination result obtained in step S47 indicates that the score derived from the zoom scene HMM is lower than the score derived from the non-zoom scene HMM, the scene determining section 55 proceeds to step S49 and determines that the observed scene is not a zoom scene.

When the determination of the currently observed scene is finished, the scene determining section 55 proceeds to step S50 and determines whether all the scenes have been observed. If the obtained determination result does not indicate that all the scenes have been observed, the scene determining section 55 returns to step S45, observes another scene, and repeats the subsequent processing steps.

If the determination result obtained in step S50 indicates that all the scenes have been observed, the scene determining section 55 terminates the process.

The above process determines whether the scenes included in the personal video are face scenes, group scenes, or zoom scenes. The obtained determination results are supplied to the browser application 56 and displayed in the browser screen.

Figure 19:
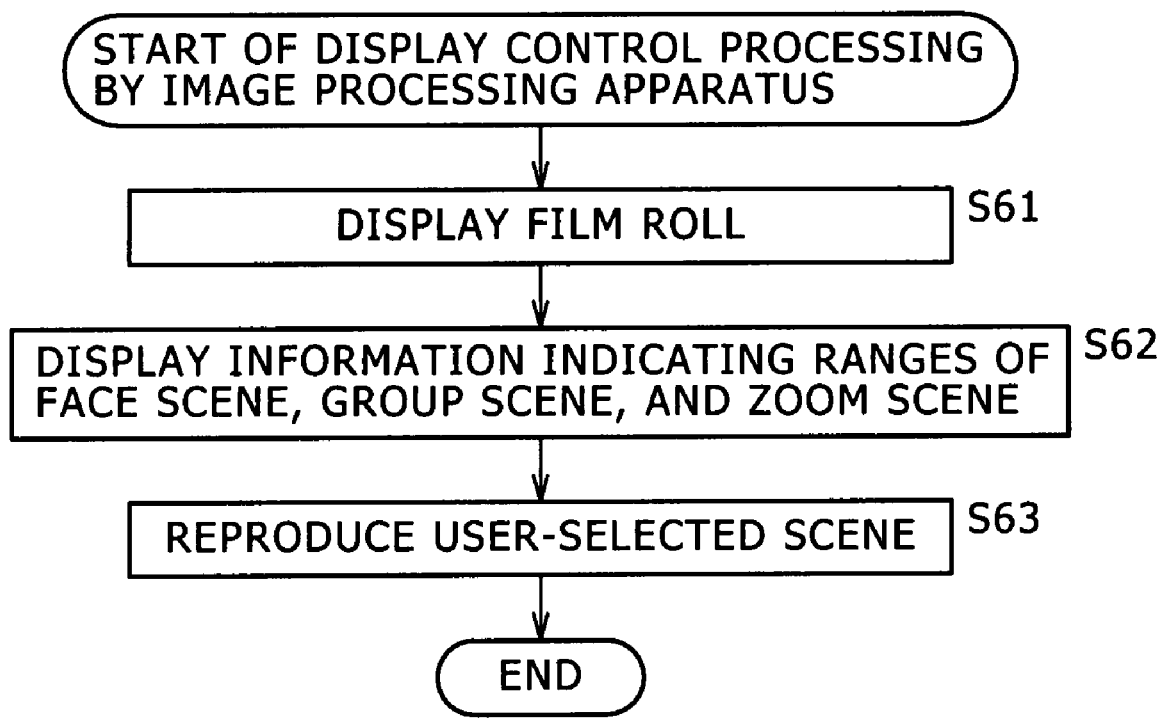
FIG. 19 is a flowchart illustrating a display control process that is performed by the image processing apparatus.

A browser screen display control process that is performed by the image processing apparatus 1 will now be described with reference to a flowchart in FIG. 19.

In step S61, the browser application 56 opens the browser screen and causes the film roll display field 21 in the scene information display section 13 of the browser screen to display a film roll view in which miniature versions of still pictures constituting the personal video are displayed in the order of shooting.

In step S62, the browser application 56 causes the face scene information display field 23 in the scene information display section 13 to display the information about the ranges of face scenes and the group scene information display field 24 to display the information about the ranges of group scenes. In addition, the zoom scene information display field 25 displays the information about the ranges of zoom scenes in accordance with the determination results supplied from the scene determining section 55.

When a particular scene is selected by the user, the browser application 56 performs step S63 to reproduce the user-selected scene and causes the image display section 11 in the browser screen to display the obtained image. When, for instance, an instruction is issued to finish displaying the browser screen, the process terminates.

When the above process is performed, the browser screen that looks like FIG. 5 opens, allowing the user to selectively view favorite scenes such as scenes including a close-up of a human face.

Figure 20:
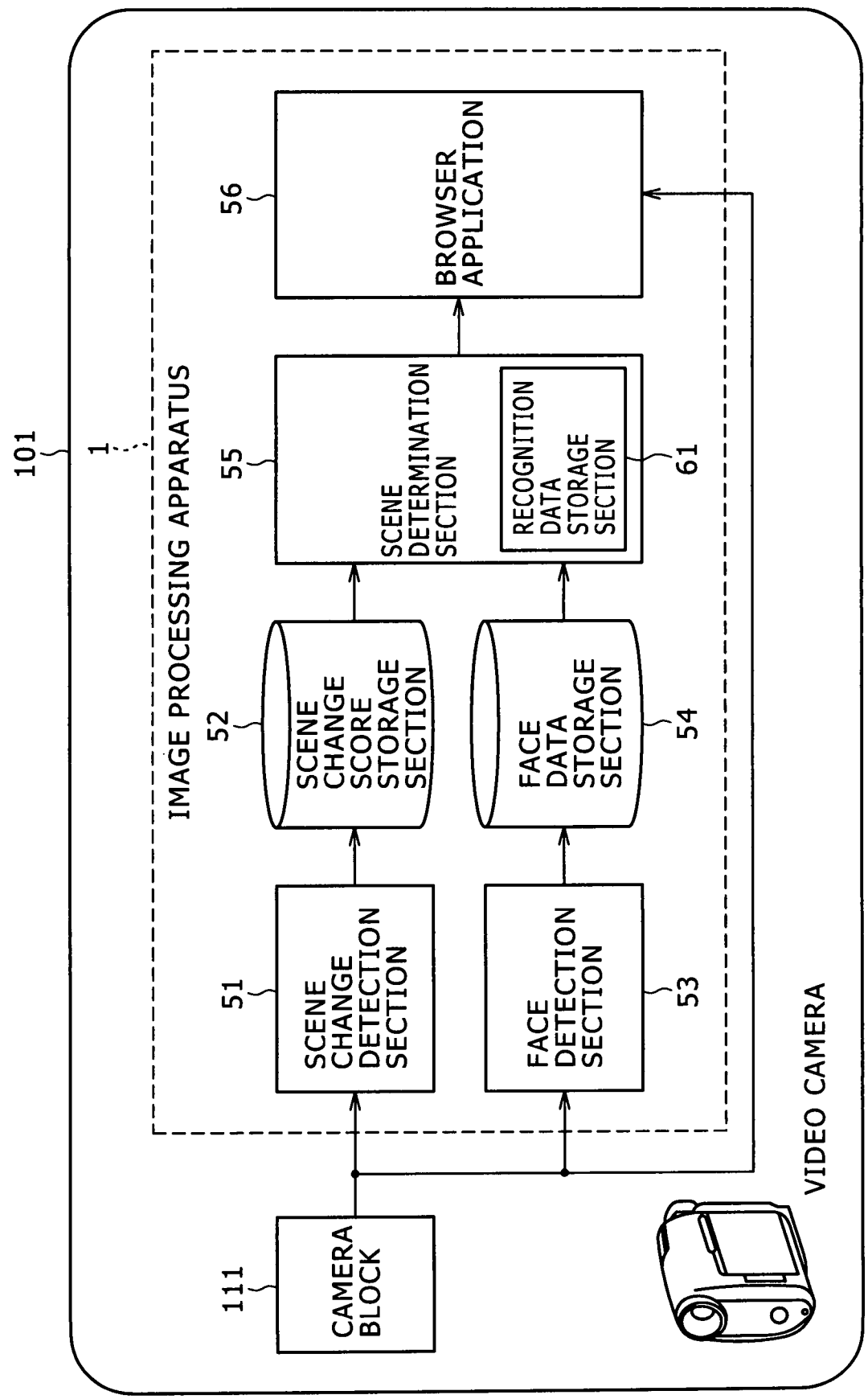
FIG. 20 shows an example that illustrates how the image processing apparatus is implemented.

FIG. 20 shows an example that illustrates how the image processing apparatus 1 is implemented.

In the example shown in FIG. 20, the overall configuration of the image processing apparatus 1 shown in FIG. 7 is implemented as the configuration of a video camera 101. The video camera 101 includes a camera block 111.

The camera block 111 includes a lens, an image pickup device for converting the light emitted from a subject imaged via the lens to an electrical signal, and a signal processing circuit for performing a predetermined process on the signal output from the image pickup device to generate a personal video signal. The scene change detection section 51 of the video camera 101 performs a scene change detection process on the personal video supplied from the camera block 111. The face detection section 53 performs a face detection process on still pictures constituting the personal video supplied from the camera block 111.

The browser screen appears, for instance, in a display section (not shown) of the video camera 101 depending on the browser application 56 shown in FIG. 20. The video camera 101 also includes a drive that records the personal video onto a tape, optical disc, or the like.

When the video camera (camcorder) opens the browser screen after formulating a scene determination as described above, the user can select a favorite scene and readily confirm the contents of the personal video that the user has shot.

Figure 21:
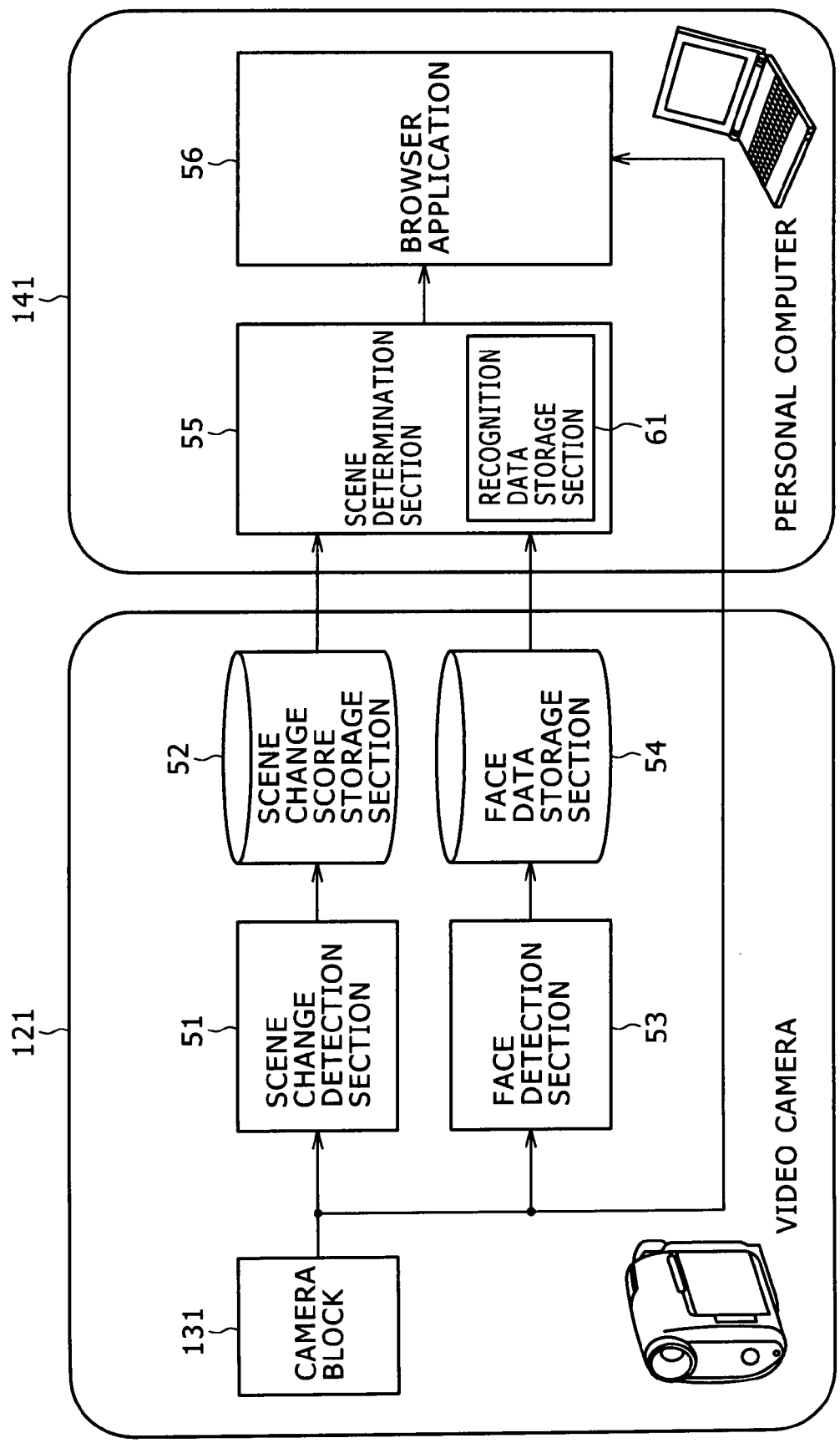
FIG. 21 shows another example that illustrates how the image processing apparatus is implemented.

FIG. 21 shows another example that illustrates how the image processing apparatus 1 is implemented.

In the example shown in FIG. 21, the scene change detection section 51, scene change score storage section 52, face detection section 53, and face data storage section 54, which are included in the image processing apparatus 1 shown in FIG. 7, are implemented as the elements of a video camera 121, whereas the scene determining section 55 and browser application 56 are implemented as the elements of a personal computer 141. The video camera 121 also includes a camera block 131.

The camera block 131 includes a lens, an image pickup device, and a signal processing circuit as is the case with the camera block 111 shown in FIG. 20. The scene change detection section 51 of the video camera 121 performs a scene change detection process on the personal video supplied from the camera block 131. The face detection section 53 performs a face detection process on still pictures constituting the personal video supplied from the camera block 131.

The scene change data obtained by the scene change detection section 51 and the face data obtained by the face detection section 53 are stored in the scene change score storage section 52 and face data storage section 54, respectively, and loaded into the personal computer 141 with predefined timing together with the shot personal video. The scene change data, face data, and personal video are loaded into the personal computer 141 via, for instance, a tape or other recording medium or a wireless communications link. The loaded data is then recorded, for instance, onto a built-in hard disk in the personal computer 141.

The scene determining section 55 of the personal computer 141 formulates a scene determination as described earlier in accordance with the scene change data and face data, which are loaded from the video camera 121, and outputs the determination results to the browser application 56. The browser application 56 opens the browser screen on a display or like device provided for the personal computer 141, and reproduces the personal video in accordance with user commands.

In the above example in which the process between personal video loading and browser screen opening is described, the processing steps for generating the scene change data and face data are performed by the video camera 121, and the subsequent processing steps are performed by the personal computer 141. The configuration of the image processing apparatus 1 can be implemented not only in a personal computer but also in a home server that handles various types of content such as motion pictures, still pictures, and music.

Figure 22:
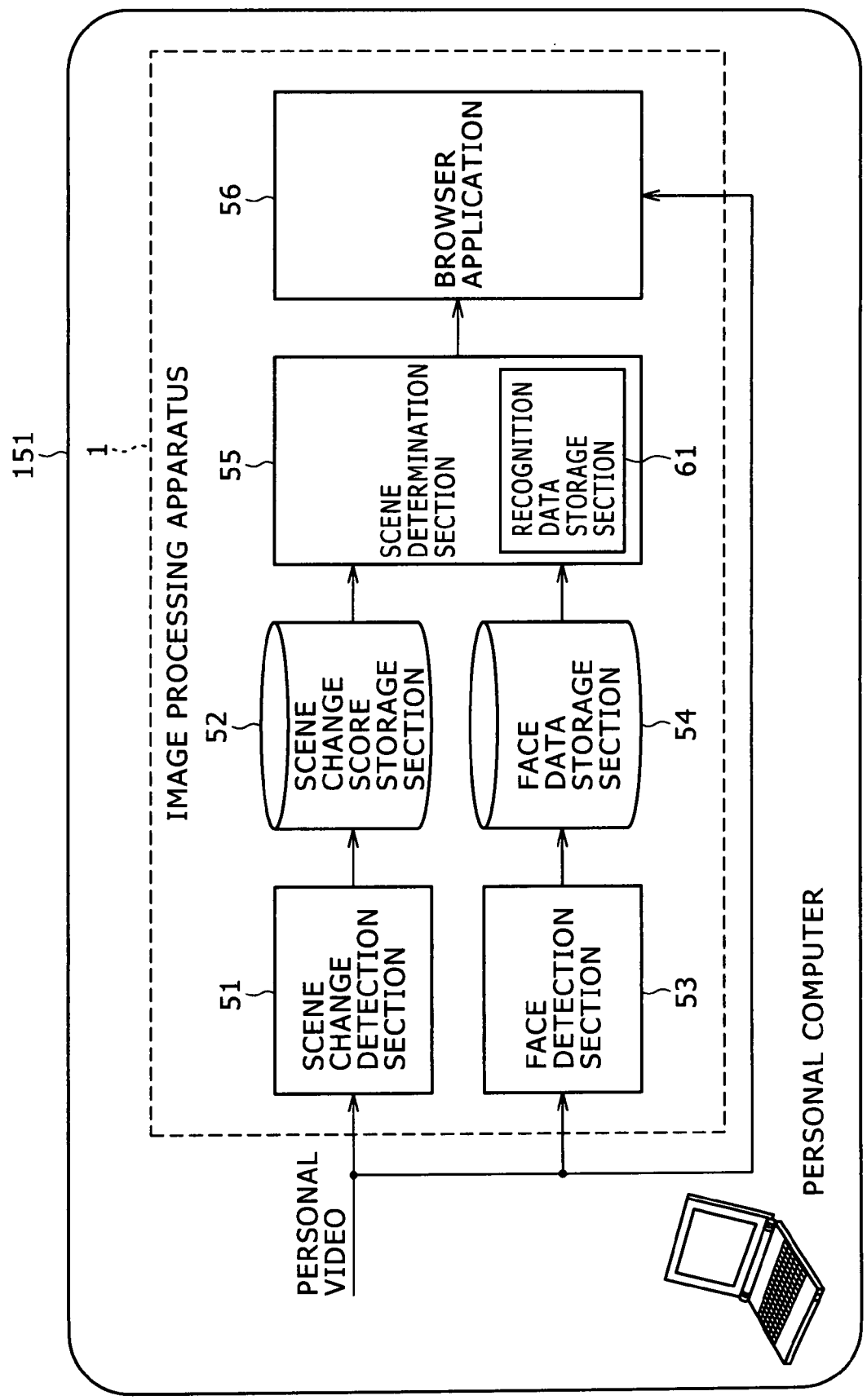
FIG. 22 shows still another example that illustrates how the image processing apparatus is implemented.

FIG. 22 shows still another example that illustrates how the image processing apparatus 1 is implemented.

In the example shown in FIG. 22, the entire configuration of the image processing apparatus 1 shown in FIG. 7 is implemented as the configuration of a personal computer 151. The personal video shot, for instance, with a video camera is loaded from the video camera to the personal computer 151 via a tape or other recording medium or via a wireless communications link, and the scene determination and browser screen opening processes described above are performed on the loaded personal video. The scene change detection, face detection, and scene determination processes may be performed while the personal computer 141 is idle and not immediately after loading of the personal video.

As described above, the entire configuration of the image processing apparatus 1 can be implemented by a single apparatus or implemented cooperatively by a plurality of apparatuses.

Figure 23:
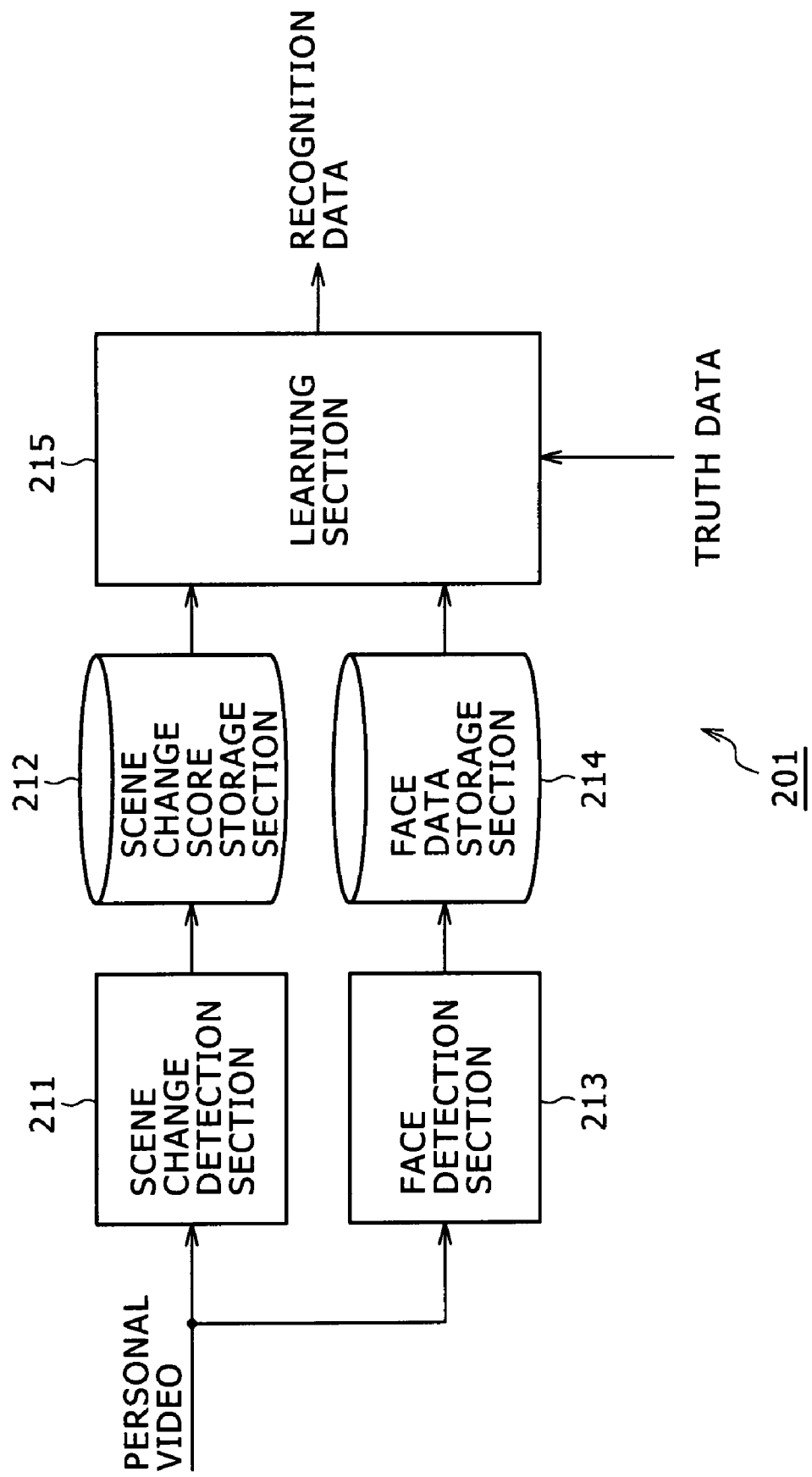
FIG. 23 is a block diagram illustrating a typical functional configuration of a learning apparatus.

FIG. 23 is a block diagram illustrating a typical functional configuration of a learning apparatus 201.

As mentioned earlier, the HMMs used for scene determination are prepared as recognition data in the recognition data storage section 61 of the image processing apparatus 1. The recognition data is generated by the learning apparatus 201. When, for instance, the image processing apparatus 1 is implemented in a video camera as indicated in FIG. 20, the learning apparatus 201 is used, for instance, by development personnel in a manufacturer prior to video camera shipment.

As shown in FIG. 23, the learning apparatus 201 has basically the same configuration as the image processing apparatus 1 except that a learning section 215 is provided to replace the scene determining section 55 and that the browser application 56 is not included. More specifically, the learning apparatus 201 includes a scene change detection section 211, a scene change score storage section 212, a face detection section 213, a face data storage section 214, and the learning section 215.

The scene change detection section 211 corresponds to the scene change detection section 51 shown in FIG. 7. The scene change score storage section 212 corresponds to the scene change score storage section 52 shown in FIG. 7. The face detection section 213 corresponds to the face detection section 53 shown in FIG. 7. The face data storage section 214 corresponds to the face data storage section 54 shown in FIG. 7.

The scene change detection section 211 performs a scene change detection process on the supplied personal video, obtains a scene change score as a result of scene change detection, causes the scene change score storage section 212 to store the obtained scene change score, determines a scene change position from the score, and causes the scene change score storage section 212 to store the resulting scene change data.

The face detection section 213 performs a face detection process on still pictures constituting the supplied personal video or still pictures constituting the personal video that is thinned by removing some frames. It should be noted that the face detection section 213 performs the same face detection process as the face detection section 53 of the image processing apparatus 1. The face detection section 213 acquires face data as a result of face detection and causes the face data storage section 214 to store the acquired face data.

The personal video supplied to the scene change detection section 211 and face detection section 213 is learning video that is shot, for instance, with a video camera. This video includes, for instance, a picture showing the face of a human, a picture showing the faces of a plurality of humans, and a picture showing a close-up of a human face.

When a scene in which a human face or other object is visible is specified by the user, the learning section 215 reads from the face data storage section 214 a time series of face data derived from still pictures constituting a scene that is user-specified as a scene in which the object is visible, as described with reference to FIG. 13, and generates, in accordance with the read time series of face data, an HMM for determining the scene in which the object is visible.

Further, when a scene in which a certain object is not visible is specified by the user (when a scene in which an object is visible is not specified by the user), the learning section 215 reads from the face data storage section 214 a time series of face data derived from still pictures constituting the user-specified scene, which is a scene without the object, and generates, in accordance with the read time series of face data, an HMM for determining the scene in which the object is not visible.

In other words, the user of the learning apparatus 201, such as the development personnel in a manufacturer, has to operate a predetermined player to reproduce the same video as the personal video supplied to the scene change detection section

211 and face detection section 213, view the reproduced video by the eye, and note the scenes to be determined by the image processing apparatus 1. Then the user enters into the learning apparatus 201 as truth data the information indicating which scenes show the object and which scenes do not show the object.

When the image processing apparatus 1 is to determine face scenes, group scenes, and zoom scenes, the user enters into the learning apparatus 201 as truth data the information indicating which scenes contain a still picture showing the face of a human, which scenes contain a still picture showing the faces of many humans, and which scenes contain a still picture showing a close-up of a human face.

The learning section 215 outputs the generated HMM as recognition data. The output recognition data is then stored in the recognition data storage section 61 of the image processing apparatus 1.

Figure 24:
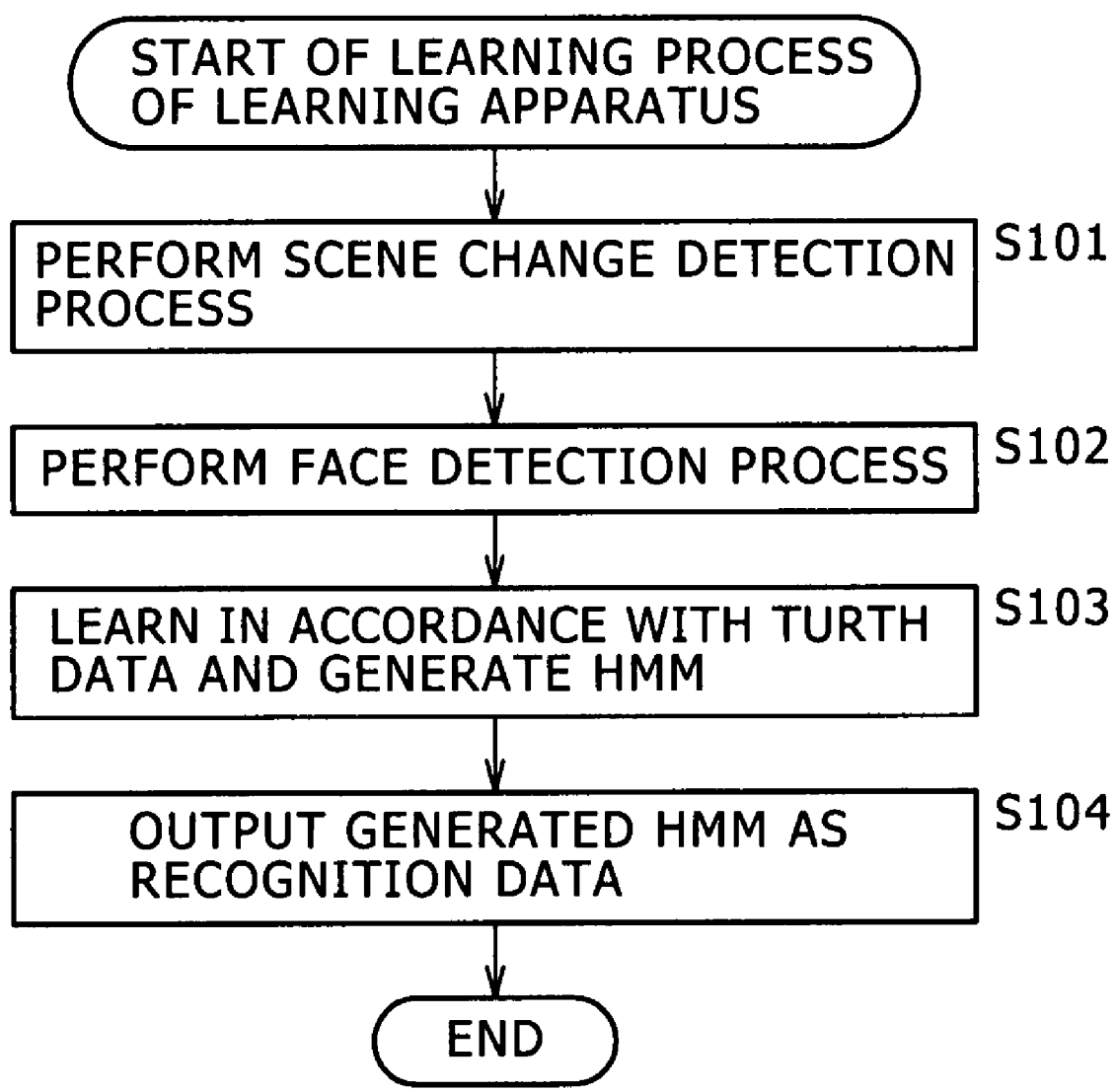
FIG. 24 is a flowchart illustrating a learning process that is performed by the learning apparatus.

A learning process that is performed by the learning apparatus 201 will now be described with reference to a flowchart in FIG. 24.

In step S101, the scene change detection section 211 performs a scene change detection process on the personal video, and causes the scene change score storage section 212 to store scene change data.

In step S102, the face detection section 213 performs a face detection process on still pictures constituting the personal video or still pictures constituting the personal video that is thinned by removing some frames. It should be noted that the face detection section 213 performs the same face detection process as the face detection section 53 of the image processing apparatus 1. The face detection section 213 then causes the face data storage section 214 to store face data.

In step S103, the learning section 215 conducts learning in accordance with truth data entered by the user and a time series of face data stored in the face data storage section 214, and generates an HMM.

The learning section 215 performs step S104 to output the generated HMM as recognition data, and then terminates the process.

When the above process is completed, the recognition data is generated. The generated recognition data is then prepared in the image processing apparatus 1. Consequently, the user of the image processing apparatus 1 does not have to prepare an HMM, for instance, by entering truth data, and can formulate a scene determination simply by preparing the personal video.

It goes without saying that the user of the image processing apparatus 1 may cause the image processing apparatus 1 to learn about the personal video shot by the user and prepare the recognition data in the recognition data storage section 61. In such an instance, however, the user has to view the personal video shot by the user and enter truth data into the image processing apparatus 1 in accordance with the scenes to be determined.

The embodiment described above assumes that the individual scenes of the personal video are checked to determine whether they are face scenes, group scenes, or zoom scenes. However, the alternative may be provided to change the recognition data to be prepared in the image processing apparatus 1 in accordance with the object to be determined, and check the scenes to determine whether they contain a still picture showing another object.

For example, it is possible to detect the features of scenery, prepare in the image processing apparatus 1 in accordance with the detected features an HMM for determining whether scenes contain a still picture showing scenery, and determine whether scenes show scenery.

The embodiment described above assumes that the HMM is used for scene determination. Alternatively, however, another algorithm, such as a Viterbi algorithm or neutral network, for pattern recognition in relation to time-series data may be used to formulate a scene determination.

Further, threshold processing may be performed to formulate a scene determination instead of performing a pattern recognition process for scene determination purposes. A typical alternative would be to average the number of faces indicated by the face data derived from all still pictures constituting the personal video, use the resulting average value as a threshold value, and recognize a group scene (a scene in which many faces are visible) that contains a still picture in which the number of visible faces is larger than the threshold value. In this instance, too, a scene determination is formulated on an individual scene basis. Therefore, it is possible to avoid the determination results from being fragmented contrast to a situation where determination results are obtained in the unit of a portion that is smaller than a scene.

When a scene determination is formulated by threshold processing instead of pattern recognition, the resulting process load is lighter than when a scene determination is based on pattern recognition. Therefore, the method for formulating a scene determination by threshold processing can be applied to cellular phones, digital video cameras, digital still cameras, and other apparatuses whose processing capacity is smaller than that of a personal computer.

When the scene determining section 55 formulates a scene determination in the embodiment described above, the browser screen opens in accordance with the determination results, allowing the user to reproduce a particular scene from the browser screen. Alternatively, however, the relationship between the determination results and personal video may be stored and used for personal video editing or other processing purposes.

A series of processes described above may be executed by hardware or by software. When the series of processes is to be executed by software, the programs constituting the software are installed from a program storage medium onto a computer built in dedicated hardware or a general-purpose personal computer or other computer that can execute various functions when various programs are installed.

FIG. 25 is a block diagram illustrating a typical configuration of a personal computer that performs the series of processes.

A CPU (Central Processing Unit) 221 performs various processes in accordance with programs that are stored in a ROM (Read Only Memory) 222 or a storage section 228. A RAM (Random Access Memory) 223 stores, for instance, the programs to be executed by the CPU 221 and data as necessary. The CPU 221, ROM 222, and RAM 223 are interconnected via a bus 224.

The CPU 221 is connected to an input/output interface 225 via the bus 224. The input/output interface 225 is connected to an input section 226, which includes a keyboard, a mouse, a microphone, and the like, and to an output section 227, which includes a display, a projection a speaker, and the like. The CPU 221 performs various processes in compliance with instructions input from the input section 226. The CPU 221 outputs processing results to the output section 227.

The storage section 228, which is connected to the input/output interface 225, is, for instance, a hard disk and used to store the programs to be executed by the CPU 221 and various data. A communication section 229 communicates with an external apparatus via a network such as the Internet or local area network.

When a magnetic disk, optical disc, semiconductor memory, or other removable medium 231 is set in a drive 230 that is connected to the input/output interface 225, the drive 230 drives the removable medium 231 and acquires programs and data that are recorded on the removable medium 231. The acquired programs and data are transferred as necessary to the storage section 228 and stored.

As indicated in FIG. 25, the program recording medium for storing programs, which are to be installed on a computer and rendered computer-executable, is a removal medium 231, the ROM 222 in which the programs are stored temporarily or permanently, or a hard disk that constitutes the storage section 228. The removal medium 231 includes a package medium, including a magnetic disk (flexible disk included), optical disc (CD-ROM [Compact Disc-Read Only Memory] and DVD [Digital Versatile Disc] included), magneto-optical disk, and semiconductor memory, The programs are stored on the program recording medium as necessary via the communication section 229, which is an interface for a router, modem, or the like, by using a wired or wireless communication medium such as the Internet, local area network, or digital satellite broadcast.

In this document, the steps that describe the programs not only include processes that are performed in a described chronological order but also include processes that are performed parallelly or individually and not necessarily in chronological order.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image processing apparatus comprising:
   scene change detection means configured to detect a scene change in a motion picture;
   object detection means configured to detect a predefined object that is contained as a subject in still pictures constituting the motion picture; and
   determining means configured to determine, in accordance with the result of a detection operation that is performed by the object detection means in relation to still pictures constituting a predefined scene between a scene change detected by the scene change detection means and a chronologically adjacent scene change, whether the predefined scene contains a still picture containing the predefined object as a subject,
   wherein the object detection means further detects information that represents features of the predefined object detected from still pictures, and
   wherein the determining means achieves chronological pattern recognition of the information representing the features of the predefined object detected by the object detection means to determine whether the predefined scene contains a still picture containing the predefined object as a subject,
   said apparatus further comprising:
   storage means configured to store a first model that is derived from a result of the same detection operation that is performed by the object detection means in relation to still pictures constituting a scene containing a still picture containing the predefined object as a subject and will be used as recognition information for pattern recognition by the determining means,
   wherein the storage means further stores a second model that is derived from a result of the same detection operation that is performed by the object detection means in relation to still pictures constituting a scene containing a still picture that does not contain the predefined object as a subject; and wherein the determining means determines, in accordance with a score obtained from the first model as a result of a detection operation performed by the object detection means and a score obtained from the second model, whether the predefined scene contains a still picture containing the predefined object as a subject.

2. The image processing apparatus according to claim 1, further comprising:
   reproduction means configured to reproduce scenes of the motion picture that are determined by the determining means to contain a still picture containing the predefined object as a subject.

3. The image processing apparatus according to claim 2, wherein the reproduction means further displays the positions within the entire motion picture of scenes that are determined by the determining means to contain a still picture containing the predefined object as a subject.

4. The image processing apparatus according to claim 1, wherein, when a scene change within the motion picture is to be detected by comparing the difference in features of two chronologically adjacent still pictures against a threshold value, the scene change detection means detects a scene change in which different scene granularities are defined with the threshold value changed.

5. The image processing apparatus according to claim 1, wherein the scene change detection means is configured to generate scene change data indicating at least one of a start position or start time and at least one of an end position or end time of scenes within the motion picture.

6. The image processing apparatus according to claim 1, further comprising:
   reproduction means configured to reproduce a film roll view of the motion picture in which still pictures are displayed in a same order as that of the motion picture.

7. The image processing apparatus according to claim 6, wherein the reproduction means is configured to display information about the ranges of scenes of the motion picture that are determined by the determining means to contain a still picture containing the predefined object as a subject.

8. The image processing apparatus according to claim 6, wherein the reproduction means is configured to receive a user-selection of a particular scene of the motion picture and to reproduce the user-selected scene.

9. An image processing method for use by an image processing apparatus, said method comprising:
   detecting a scene change in a motion picture;
   detecting a predefined object that is contained as a subject in still pictures constituting the motion picture; and
   determining, in accordance with the result of a detection operation that is performed to detect the predefined object in still pictures constituting a predefined scene between a detected scene change and a chronologically adjacent scene change, whether the predefined scene contains a still picture containing the predefined object as a subject,
   wherein the object detecting step further detects information that represents features of the predefined object detected from still pictures, and
   wherein the determining step achieves chronological pattern recognition of the information representing the features of the predefined object detected by the object detecting step to determine whether the predefined scene contains a still picture containing the predefined object as a subject,
   said method further comprising:

storing a first model that is derived from a result of the same detection operation that is performed by the object detecting step in relation to still pictures constituting a scene containing a still picture containing the predefined object as a subject and will be used as recognition information for pattern recognition by the determining means, wherein the storing step further stores a second model that is derived from a result of the same detection operation that is performed by the object detecting step in relation to still pictures constituting a scene containing a still picture that does not contain the predefined object as a subject; and wherein the determining step determines, in accordance with a score obtained from the first model as a result of a detection operation performed by the object detecting step and a score obtained from the second model, whether the predefined scene contains a still picture containing the predefined object as a subject.

10. The image processing method according to claim 9, further comprising:

generating scene change data indicating at least one of a start position or start time and at least one of an end position or end time of scenes within the motion picture.

11. The image processing method according to claim 9, further comprising:

reproducing a film roll view of the motion picture in which still pictures are displayed in a same order as that of the motion picture.

12. The image processing method according to claim 11, further comprising:

displaying information about the ranges of scenes of the motion picture that are determined by the determining step to contain a still picture containing the predefined object as a subject.

13. The image processing method according to claim 11, further comprising:

receiving a user-selection of a particular scene of the motion picture, and reproducing the user-selected scene.

14. A processor encoded with a computer program for carrying out an image processing method, the method comprising:

detecting a scene change in a motion picture;

detecting a predefined object that is contained as a subject in still pictures constituting the motion picture; and determining, in accordance with the result of a detection operation that is performed to detect the predefined object in still pictures constituting a predefined scene between a detected scene change and a chronologically adjacent scene change, whether the predefined scene contains a still picture containing the predefined object as a subject, wherein the object detecting step further detects information that represents features of the predefined object detected from still pictures, and wherein the determining step achieves chronological pattern recognition of the information representing the features of the predefined object detected by the object detecting step to determine whether the predefined scene contains a still picture containing the predefined object as a subject, said method further comprising:

storing a first model that is derived from a result of the same detection operation that is performed by the object detecting step in relation to still pictures constituting a scene containing a still picture containing the predefined object as a subject and will be used as recognition information for pattern recognition by the determining means, wherein the storing step further stores a second model that is derived from a result of the same detection operation that is performed by the object detecting step in relation to still pictures constituting a scene containing a still picture that does not contain the predefined object as a subject; and wherein the determining step determines, in accordance with a score obtained from the first model as a result of a detection operation performed by the object detecting step and a score obtained from the second model, whether the predefined scene contains a still picture containing the predefined object as a subject.

15. An image processing apparatus comprising:

a scene change detection section configured to detect a scene change in a motion picture;

an object detection section configured to detect a predefined object that is contained as a subject in still pictures constituting the motion picture; and a determining section configured to determine, in accordance with the result of a detection operation that is performed by the object detection section in relation to still pictures constituting a predefined scene between a scene change detected by the scene change detection section and a chronologically adjacent scene change, whether the predefined scene contains a still picture containing the predefined object as a subject, wherein the object detection section is further configured to detect information that represents features of the predefined object detected from still pictures, and wherein the determining section is further configured to achieve chronological pattern recognition of the information representing the features of the predefined object detected by the object detection section to determine whether the predefined scene contains a still picture containing the predefined object as a subject, said apparatus further comprising:

a storage section configured to store a first model that is derived from a result of the same detection operation that is performed by the object detection section in relation to still pictures constituting a scene containing a still picture containing the predefined object as a subject and will be used as recognition information for pattern recognition by the determining section, wherein the storage section is further configured to store a second model that is derived from a result of the same detection operation that is performed by the object detection section in relation to still pictures constituting a scene containing a still picture that does not contain the predefined object as a subject; and wherein the determining section determines, in accordance with a score obtained from the first model as a result of a detection operation performed by the object detection section and a score obtained from the second model, whether the predefined scene contains a still picture containing the predefined object as a subject.

* * * * *